US012798679B2

(12) United States Patent
Bonutti et al.

(10) Patent No.: US 12,798,679 B2
(45) Date of Patent: Nov. 17, 2026

(54) UNITARY TRUCK BODY AND ASSOCIATED MANUFACTURING METHODS

(71) Applicants: Henrik Bonutti, Bloomfield Hills, MI (US); Robert J. Eickholt, Franklin, MI (US); Marc Kruse, Greer, SC (US)

(72) Inventors: Henrik Bonutti, Bloomfield Hills, MI (US); Robert J. Eickholt, Franklin, MI (US); Marc Kruse, Greer, SC (US)

(73) Assignee: BEK Structures LLC, Bloomfield Hills, MI (US)

( * ) Notice: Subject to any disclaimer, the term of this patent is extended or adjusted under 35 U.S.C. 154(b) by 460 days.

(21) Appl. No.: 18/379,240

(22) Filed: Oct. 12, 2023

(65) Prior Publication Data

US 2024/0124064 A1 Apr. 18, 2024

Related U.S. Application Data

(60) Provisional application No. 63/416,570, filed on Oct. 16, 2022.

(51) Int. Cl.

*B62D 23/00* (2006.01)
*B62D 25/20* (2006.01)
*B62D 29/00* (2006.01)
*B62D 33/04* (2006.01)

(52) U.S. Cl.

CPC ......... *B62D 23/005* (2013.01); *B62D 29/001* (2013.01); *B62D 25/2054* (2013.01); *B62D 33/044* (2013.01)

(58) Field of Classification Search

CPC .... B62D 33/04; B62D 33/044; B62D 33/046; B62D 25/00; B62D 25/02; B62D 25/20; B62D 25/2036; B62D 25/2054; B62D 25/06; B62D 27/02; B62D 27/023; B62D 27/06; B62D 27/065; B62D 23/005; B62D 29/008

See application file for complete search history.

(56) References Cited

U.S. PATENT DOCUMENTS

| | | | | | |
|---|---|---|---|---|---|
| 6,022,070 | A * | 2/2000 | Ashina | B62D 29/008 | 296/205 |
| 6,250,410 | B1 * | 6/2001 | Balestrini | B60N 2/015 | 180/68.5 |
| 8,641,133 | B1 * | 2/2014 | Scaringe | B62D 29/008 | 296/193.03 |
| 10,464,617 | B2 * | 11/2019 | Findley | B62D 23/005 | |

(Continued)

*Primary Examiner* — Gregory A Blankenship
(74) *Attorney, Agent, or Firm* — Robert J. Lauf

(57) ABSTRACT

A truck body includes a rigid aluminum frame, the frame comprising: a load floor and underbody comprising structural extrusions oriented longitudinally; subassemblies comprising aluminum extrusions formed into frames defining the body walls; and, at least one subassembly comprising aluminum extrusions formed into a frame defining the body roof, and wherein the load floor, wall subassemblies, and roof subassembly are fastened together to form a rigid final assembly. Roll formed steel tubular members may be substituted for the aluminum extrusions. The invention may further be adapted to make modular trailers that can be customized by choosing among different wall and roof modules. Related assembly methods are also disclosed.

19 Claims, 20 Drawing Sheets

(56) References Cited

U.S. PATENT DOCUMENTS

2003/0030303 A1* 2/2003 Panoz .................... B62D 23/00 296/204
2003/0230443 A1* 12/2003 Cramer ................ B62D 21/152 180/65.51
2004/0104601 A1* 6/2004 Durand ................ B62D 29/048 296/203.01
2005/0022460 A1* 2/2005 Ferren .................... B62D 39/00 52/36.5
2005/0050730 A1* 3/2005 Marando .............. B62D 29/008 29/428
2008/0036240 A1* 2/2008 Lusk .................... B62D 29/043 296/178
2008/0169671 A1* 7/2008 Hedderly ............... B62D 25/00 296/146.11
2009/0212601 A1* 8/2009 Favaretto ............. B62D 27/023 296/203.01
2015/0021892 A1* 1/2015 Moss ................... B62D 27/023 228/101
2015/0291228 A1* 10/2015 Huber .................. B62D 29/043 296/181.2
2016/0152281 A1* 6/2016 Hansen .............. B60N 2/01558 29/458
2017/0259854 A1* 9/2017 Sausaman ............ B62D 65/024
2018/0148103 A1* 5/2018 Castillo ................ B62D 23/005
2018/0237076 A1* 8/2018 Perlo ........................ B60K 1/02
2020/0114995 A1* 4/2020 Anderson ............ B62D 31/025
2020/0155386 A1* 5/2020 Kumar ............... B62D 25/2054
2020/0406978 A1* 12/2020 Hattori ................... B62D 24/00
2020/0406980 A1* 12/2020 Hattori ................. B62D 25/025
2021/0129917 A1* 5/2021 Sagarsee ............ B62D 25/2054
2022/0048579 A1* 2/2022 Seo ...................... B62D 23/005
2022/0097777 A1* 3/2022 Letendre .............. B62D 29/001
2022/0274650 A1* 9/2022 Willison .............. B62D 63/025
2022/0324521 A1* 10/2022 Kumar ...................... B60P 1/52
2023/0243392 A1* 8/2023 Willison .............. B60K 7/0007 188/73.31
2023/0249766 A1* 8/2023 Mo ........................ B62D 27/04 296/187.12
2023/0382467 A1* 11/2023 Song ...................... B62D 24/00
2023/0406412 A1* 12/2023 Alwan ................. B62D 27/023
2024/0124064 A1* 4/2024 Bonutti ................ B62D 29/001
2024/0181861 A1* 6/2024 Perlo ...................... B60J 5/0443
2025/0019148 A1* 1/2025 Kawamata ........... B65D 81/365
2025/0091660 A1* 3/2025 Kim ....................... B62D 25/06
2025/0276738 A1* 9/2025 Siddiqi ................ B62D 23/005
2026/0001127 A1* 1/2026 Czinger .................... B22F 5/10

* cited by examiner

UNITARY TRUCK BODY AND ASSOCIATED MANUFACTURING METHODS

CROSS REFERENCE TO RELATED APPLICATION

This application claims the benefit of U.S. Prov. Pat. Appl. No. 63/416,570, entitled, "Unitary Truck Body and Associated Manufacturing Methods" and filed by Applicants on Oct. 16, 2022, the entire disclosure of which is incorporated herein by reference.

BACKGROUND OF THE INVENTION

Field of the Invention

The invention pertains to the manufacture of motor vehicles, and more particularly to structural designs and manufacturing methods suited for making delivery and utility vehicles with an aluminum unibody.

Description of Related Art

Body-On-Frame (BOF) Design

From the earliest years of the auto industry, cars were designed around a separate body structure attached to a steel ladder frame that held the powertrain and suspension. The detachable body provided seating space and protection for occupants, while the ladder frame handled all the suspension loads, powertrain loads, and supported and distributed the overall vehicle weight and loads.

With the advent of the assembly line process, vehicle bodies were constructed and fully framed, they were then painted, and sometimes pre-assembled with certain interior parts. Then the pre-assembled, painted body would be lowered down onto and attached to the ladder frame, usually with shims sandwiched in between the body and the frame. This refers to the chassis marriage process. The steel ladder frame in turn carried the powertrain, cooling system, drivelines, axles, suspension, steering, brakes, etc. which were all pre-assembled to the frame, referred to as a rolling chassis. The BOF vehicle architecture and assembly approach continues today for pickup trucks and many large SUVs. The major difference from the earliest BOF vehicles is that large elastomeric bushings are sandwiched today between the frame and body to help isolate the occupants from road impacts and vibrations absorbed by the frame. Since the body is only attached with a limited number of elastomeric mounts the body and frame do not act as one in terms of vehicle stiffness. To meet stiffness requirements the frame generally requires additional members and patches adding cost and weight to the vehicle. Overall, BOF allows for increased trailer towing capacity since it can easily distribute trailer tongue weight between front and rear axles. And for off-road use the full frame is better at protecting the vehicle underside and absorbing impacts. Meanwhile for the vehicle manufacturer, a range of wheelbases and vehicle configurations can be accommodated with common BOF platform elements maximizing revenues from their initial capital investment. However, recognizing that the frame rails need a fair amount of section height to generate longitudinal stiffness for the vehicle, and having the body mounted on top of the frame, BOF vehicles inherently feature a higher center of gravity, leaving them more prone to rollovers.

Unibody (Monocoque) Design

The first vehicles to pioneer and introduce this method of construction entered the market at the same time: the '34 Citroen Traction Avant and the '34 Chrysler Airflow. Over succeeding decades, unibody architecture increasingly displaced BOF designs among sedans and light vehicles. A unibody has the main frame rail elements integrated directly into the underbody structure together with various stampings welded together contributing to the overall structure and stampings acting as a shear panels. Unibody vehicles are lighter than BOF designs by at least 200 lbs., they are lower cost, they are more fuel efficient, and overall they offer better handling with better ride quality. In more recent decades, the increased concern over occupant safety accelerated adoption of unibody architecture. Crash impacts are better managed when the forces and loads are reliably dispersed and distributed from the front rails into the side sills, the mid rails and tunnel, and the pillars and roof rails. (With body on frame designs, frontal impact loads can't be directly routed from the frame rails into the body structure since the body and frame are attached through elastomeric body mounts. BOF designs therefore need additional structure and weight to meet today's crash test standards.) A significant drawback of the unibody is the cost and difficulty of repair following a substantial crash event due to the inherent shingling and welded nature of body elements. Unibody creates some concern with vehicle alignment since the underbody is generally build in subassemblies often leading to variation. The suspension subframes precisely located to their area on the body may still need adjustment due to body variation. In most cases the front strut mount, critical to wheel alignment is associated with another body subassembly, therefore creating another potential point of variation.

For unibody assembly, the sheet metal body in white is typically spot welded, and joined followed by painting of the unibody. After painting, the vehicle assembly can start where all the wiring, suspension, powertrain, cooling system, interior, etc., are fitted. Similar to BOF, the modern unibody has not one, but two suspension sub-frames (front and rear) which are only connected through the unibody. Harsh jolts to the suspension are initially absorbed by the sub-frame prior to dispersion into the unibody. No one element in the unibody could handle such a force directly. Like BOF there are many systems requiring connections when chassis marriage is performed.

"Skateboard" Chassis Concept

This vehicle architecture was originally proposed in the General Motors AUTOnomy concept, a vehicle that would be powered by fuel cells and have many other features that were radically advanced for its time. The innovative "skateboard" style chassis concept housed all the car's working parts in its wheelbase. This meant that the same platform could be used for numerous different models.

Although the AUTOnomy project was never realized, the Skateboard concept and nomenclature nonetheless has stuck and today refers to a powered EV chassis that can have a range of bodies attached to it. The Tesla Model S to a large extent pioneered that approach. A key challenge all the early EV automakers faced was deciding how much range ICE customers would require in their EV, and based on that, where should the batteries be packaged? Tesla's Model S pioneered a shallow battery system that could be neatly packaged under the floor of the vehicle. The flat pack took up the entire volume between both sills and front and rear crossmembers. Other automakers agree and that has now proven to be the optimal approach for battery packaging so it is being adopted en masse. A shallow and flat under floor mounted 1200 to 1300 lb. battery package yields a much lower vehicle center of gravity, enabling superior vehicle handling and stability. Meanwhile the occupant space above the battery pack supports a flat floor with no tunnel structure intruding.

Various companies (Rivian, Canoo, REE, Pininfarina, Byton, Atlis, Rinspeed) have proposed making and selling a flat, shallow battery pack attached to a frame supporting and surrounding the pack, and integrated with front and rear suspension and drive modules. They hope to sell that platform to various automakers who just have to add their "tophat" or body to the "skateboard". It potentially reduces the capital investment cost for the automaker, while the variable cost leverages volume manufacturing costs when more EV makers adopt someone's skateboard platform.

Current Status

Heavy trucks and semitrailers still rely on the rigid chassis, which typically consists of I-beam or box section elements welded into a ladder arrangement, onto which a planar deck is attached and then any superstructure such as side walls, top, etc. The superstructure plays a limited structural role, for load bearing and for torsional rigidity, with the primary longitudinal rigidity provided by the ladder frame.

Smaller delivery vehicles have begun to incorporate unibody design, but those remain all-steel construction. For lighter-weight delivery vehicles, Grumman aircraft started building aluminum bodied delivery trucks on steel ladder frames after the Second World War. Grumman had acquired extensive expertise working with aluminum, and leveraged that in launching the Grumman Olson truck business making aluminum bodied step vans. That business grew over the years and included producing over 140,000 aluminum bodied LLV (long life vehicle) mail trucks in the 1980s on the Chevrolet S10 steel rolling chassis. But those aluminum-bodied vehicles relied on body-on-frame architecture and not a unibody. To Applicant's knowledge, no one has successfully disclosed or executed an aluminum unibody delivery vehicle, and steel ladder frames continue to provide the load carrying structure with any aluminum body simply attached to the rolling chassis. The rolling chassis Grumman vehicles struggle with outright corrosion of the steel frame and lack galvanic isolation between the aluminum and steel frame where aluminum oxidation is accelerated. In northern climates where salt is used for winter road de-icing, the steel frames have to be completely replaced as often every 8-10 years. The Grumman bodies, in addition, were pop-rivet joined which is difficult if not impossible to automate in a high-volume production process.

Furthermore, delivery vehicles are very different from passenger cars because they commonly lack window and door openings, which in an automobile allow access for the automated assembly machines, spot welders, etc. What is needed, therefore, is a better way to design and build delivery vehicles that allows the use of an all-aluminum unibody that is manufacturable by traditional automated assembly-line methods.

Objects and Advantages

Objects of the present invention include the following: providing a delivery vehicle with improved structural rigidity and reduced weight; providing methods of manufacturing a delivery vehicle having an all-aluminum unibody; providing means for making an aluminum unibody structure formed from prefabricated structural modules and employing both structural adhesives and self-tapping fasteners to join the modules together to form a rigid space frame; providing means for manufacturing a rigid platform and load deck by joining structural extrusions; and providing fixturing means so that complex extruded subassemblies may be rapidly assembled using standard joining methods. These and other objects and advantages of the invention will become apparent from consideration of the following specification, read in conjunction with the drawings.

SUMMARY OF THE INVENTION

According to one aspect of the invention, a vehicle body comprises a rigid aluminum space frame, the space frame comprising:

- a load floor and underbody comprising structural extrusions oriented longitudinally;
- subassemblies comprising aluminum extrusions formed into frames defining the body walls; and,
- at least one subassembly comprising aluminum extrusions formed into a frame defining the body roof, and wherein the load floor, wall subassemblies, and roof subassembly are bonded and fastened together to form a rigid final assembly.

The load floor and underbody may optionally comprise aluminum structural castings, forgings, or other components welded or joined to the structural aluminum platform to attach suspension components, battery packs, and other functional modules needed to complete the vehicle. Furthermore, the underbody may function as the enclosure on three sides of the battery pack to be installed from below.

According to another aspect of the invention, a method for making a unitary vehicle body comprises the following steps:

- making a load floor and underbody module comprising a plurality of hollow aluminum extrusions of selected cross sections joined together side by side to form a generally planar structure;
- making two or more wall modules comprising hollow aluminum extrusions joined together to form generally planar structures;
- making at least one roof module comprising hollow aluminum extrusions joined together to form a generally planar structure; and,
- joining the wall modules to the load floor and underbody module and joining the roof module to the wall modules, thereby forming a rigid structural space frame.

According to another aspect of the invention, a method for manufacturing an aluminum load floor and underbody module comprises:

- providing a plurality of hollow rectangular aluminum extrusions of at least two different cross sections, each having an upper surface and a lower surface when viewed endwise;
- providing a fixture whose upper surface is of such a shape that it supports each of the extrusions when placed side by side thereupon so that the abutting surfaces of the extrusions lie in a common plane regardless of the different profiles of the individual extrusions;
- clamping the extrusions securely to the fixture and to each other; and,
- welding the extrusions together along their abutting surfaces to form a generally planar structure with selected structural features on at least one of its upper and lower surfaces.

According to another aspect of the invention, a trailer chassis comprises a rigid aluminum structure, the structure comprising:

a load floor and underbody comprising structural extrusions of different cross sections oriented longitudinally and continuously welded together along their abutting edges to form a rectangular platform having an upper surface and a lower surface;

an arm structure extending longitudinally from one end of the underbody configured to engage a hitch for pulling the trailer behind a powered tow vehicle; and, at least one raised attachment point on the lower surface for attaching a wheeled suspension assembly.

According to another aspect of the invention, a trailer body comprises a rigid aluminum structure, the structure comprising:

a load floor and underbody comprising structural extrusions of different cross sections oriented longitudinally and continuously welded together along their abutting edges to form a rectangular platform having an upper surface and a lower surface;

an arm extending longitudinally from one end of the underbody configured to engage a hitch for towing the trailer behind a motor vehicle;

at least one raised attachment point on the lower surface for attaching a wheeled suspension assembly;

subassemblies comprising aluminum extrusions formed into frames defining vertical walls; and, at least one subassembly comprising aluminum extrusions formed into a frame defining the body roof, and wherein the load floor, wall subassemblies, and roof subassembly are fastened together to form a rigid final assembly.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 4A shows a plan view and FIG. 4B is an end view showing the profile (i.e., cross sectional shape) of the individual extrusions and the locations of the FSW join lines.

FIG. 5A presents a plan view and FIG. 5B presents a side view, showing a structure with some features of the skateboard chassis architecture but integrating longitudinal aluminum beams into the overall welded aluminum platform.

FIG. 6A presents a plan view and FIG. 6B presents a side view, showing that the structure has some features of the skateboard chassis architecture with aluminum frame extensions front and rear welded into the platform, or front and rear steel frame extensions which would be bolted to the aluminum platform for attaching suspensions and bumper systems.

FIG. 7A shows a floor with rail sections above, and FIG. 7B shows a floor with rail sections below. FIG. 7C shows a floor with wall mount features above and FIG. 7D shows a floor with wall mount sections below.

FIG. 11A is an end view showing that the extrusions have different thicknesses so that the structure cannot be supported on a single flat surface for FSW joining. FIG. 11B shows a supporting cradle and clamping setup that allows all extrusions to be securely held side-by-side with all the abutting locations held in a common plane FIG. 12 schematically illustrates a load floor module with an opening to mate with a suspension module in accordance with another aspect of the invention.

FIGS. 15B-D show, respectively, a rigid aluminum battery floor, a floor containing cooling channels, and a floor containing cooling channels and longitudinal members.

In FIG. 16A, Item A is the framework (extrusions and stampings); Item B is skin (stamping or composite) bonded and/or joined to framework; Item C represents fasteners in both horizontal and vertical planes as required by design (adhesive in these paths). FIGS. 16B and 16C show, respectively, the use of tracks for tie downs and covers, and the use of a track to guide a tool.

FIG. 17A: Open profile tray and insert guide rail (B) for repair system Multi purpose flange (C). FIG.

17B: Repair system is a heated wedge shape repair tool (D) to peel off glue and lifts off the structure slightly. FIG. 17C: Repair Tool clamps onto Multi-Purpose flange (E). Rollers turn (F) and propel Repair Tool alongside Multi-Purpose flange (G) in X direction of vehicle.

DETAILED DESCRIPTION OF THE INVENTION

Figure 1:
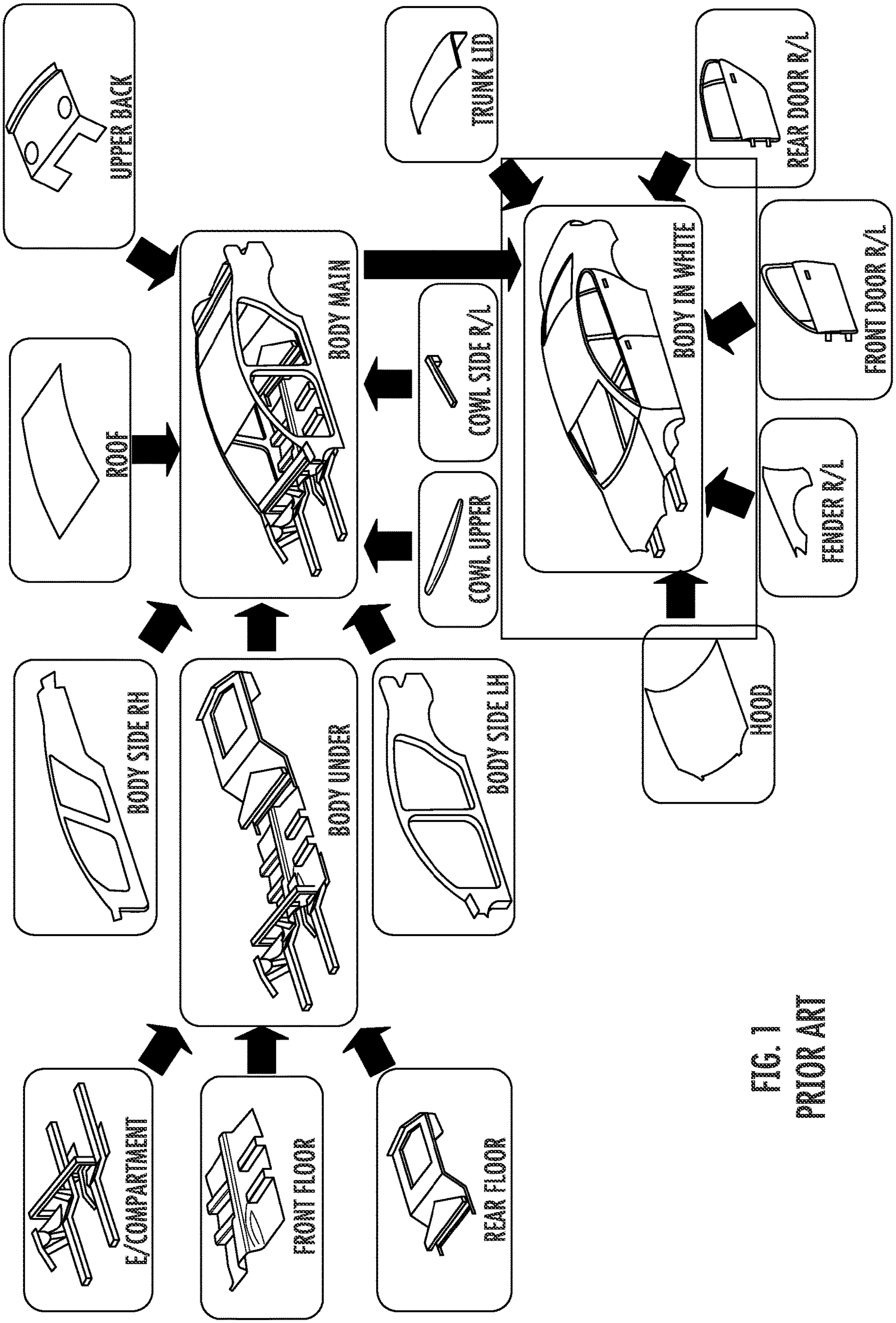
FIG. 1 PRIOR ART
FIG. 1 is a schematic diagram of the steps in assembling a typical automotive unibody from individual subassemblies in accordance with the Prior Art.

The combination of unibody construction and automated assembly has revolutionized the auto industry, not only from a manufacturing aspect but also from a performance aspect. Modern cars are lighter, more agile, safer, and more efficient compared to body-on-frame vehicles. A critical stage in conventional light vehicle construction is joining the various body subassemblies, as shown generally in FIG. 1. Accurately positioning these subassemblies in relation to each other and then locking in that geometric relationship before advancing further sets the eventual geometry of the vehicle body. Typically spot welding, MIG welding, or riveting (and in a few cases, self-tapping screws) is used to lock in the geometry.

The typical assembly approach for holding vehicle body sides, underbody, roof, front of dash, etc., to each other is a framing station. These are large moving “gates” or fixtures carrying the body subassemblies into position. When the gates come together and interlock all subassemblies are temporarily locked in relation to each other. At that point spot welding or rivet setting robots come in to quickly set the geometry so the gates can unclamp and release the body. After the initial critical spot welds are made and the geometry is set, the body advances to other robot stations for more spot welds (known as re-spot stations)

Figure 2:
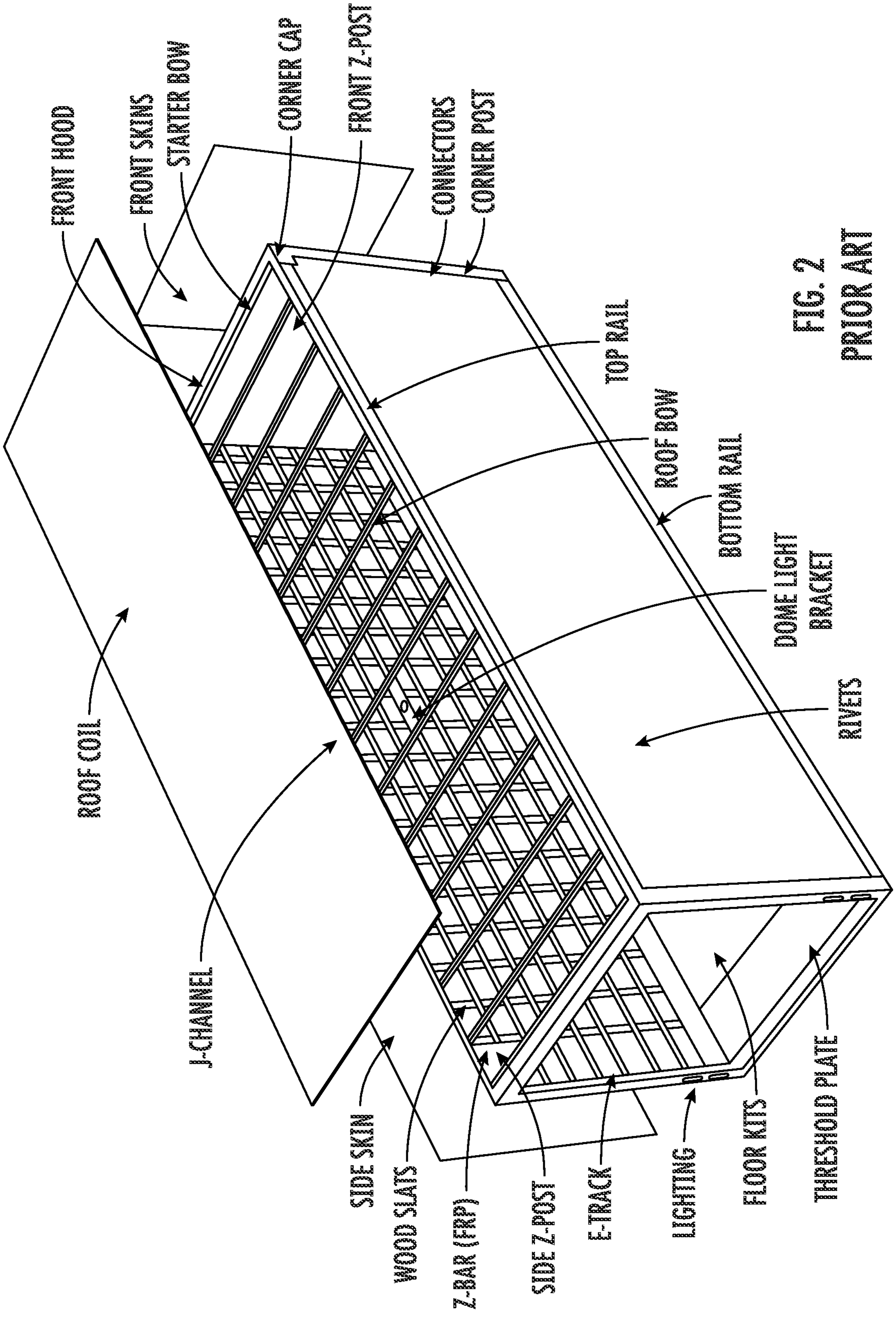
FIG. 2 PRIOR ART
FIG. 2 is a schematic diagram of the steps in assembling a typical delivery truck body in accordance with the Prior Art.

Delivery truck bodies present a unique challenge however. They don’t have window and door openings like typical light duty vehicles allowing access to robots or operators with spot weld guns, rivet setting guns, or servo driven self drilling screw guns. Lacking access to these joining flanges, many builders have to assemble the skeleton or space frame first, and then in a second operation attach the exterior skins, as shown generally in FIG. 2. This increases capital investment for the multiple stations involved, and compromises the geometry.

The modular vehicle chassis and body system.

Figure 3:
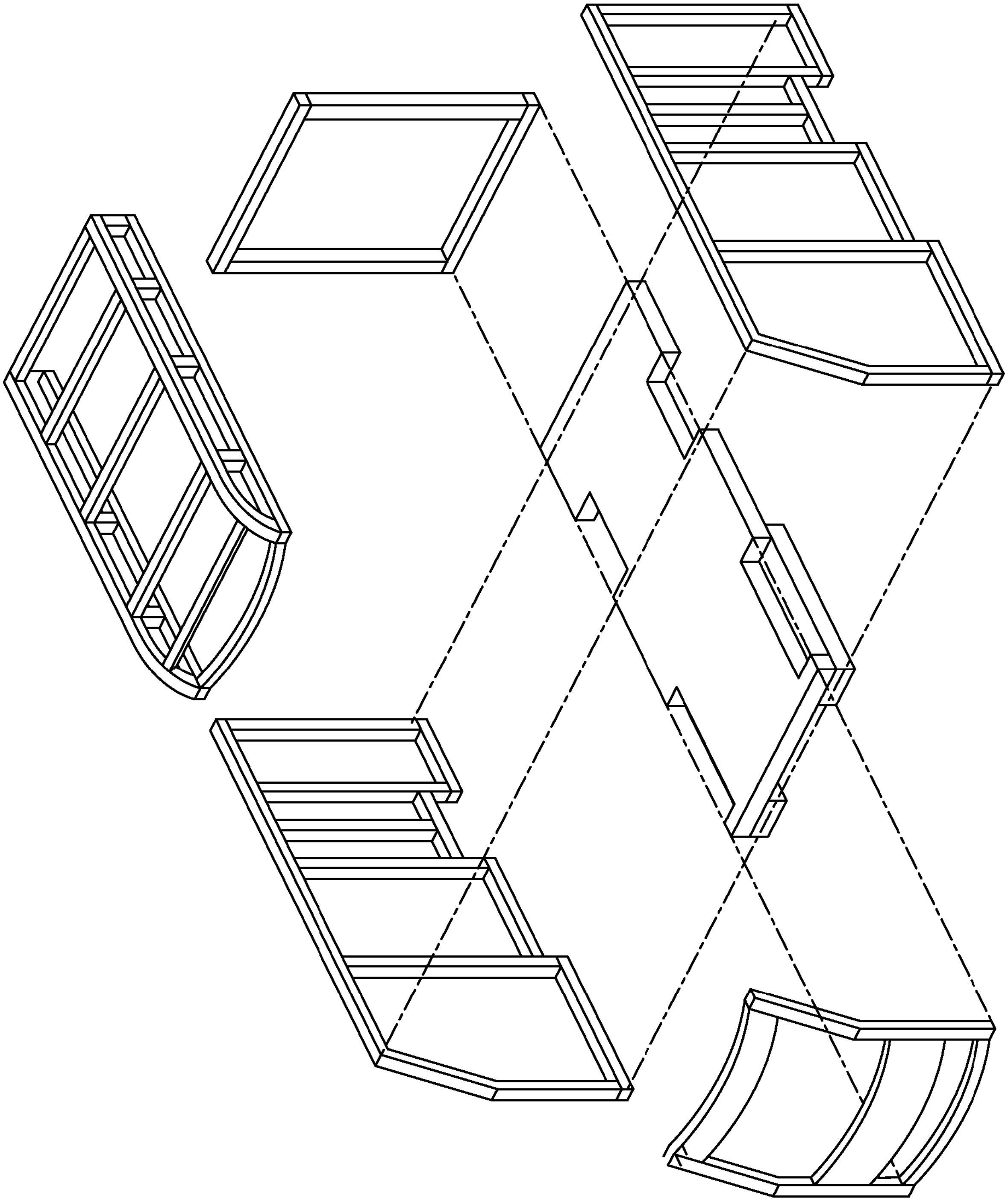
FIG. 3 is an exploded view of a truck unibody in accordance with some aspects of the invention.

FIG. 3 illustrates an exploded view of an aluminum unibody for a delivery truck constructed by joining individual modules or subassemblies (underbody/load plate, walls, and roof) along their lines of contact. Each module or subassembly is typically constructed by joining aluminum extrusions together to form a frame, which may be planar or curved as needed to form the desired outer contours of the body; the fasteners may be self-tapping screws or preferably trilobular bolts as are known in the art, and the fastener holes would be predrilled. In addition to the fasteners, structural adhesive may preferably be applied to the mating surfaces to augment the strength of the fastener system.

Although Applicants refer in some cases to a “delivery truck” in the generic sense of a boxlike structure including a compartment for the driver, it will be understood that the invention includes vehicles of various sizes and configurations, including such things as mail delivery trucks, small buses, recreational vehicles, cars, all-terrain vehicles (ATVs), utility task vehicles (UTVs), and vans. In some examples, certain aspects of the invention will be shown to offer particular benefits for electric vehicles, but the invention is not limited only to EVs and hybrids, but may also be used for traditional IC engine powered vehicles.

FIGS. 4-10 illustrate exemplary individual structural modules that may be assembled together as shown generally in FIG. 3.

Example

Figure 4A:
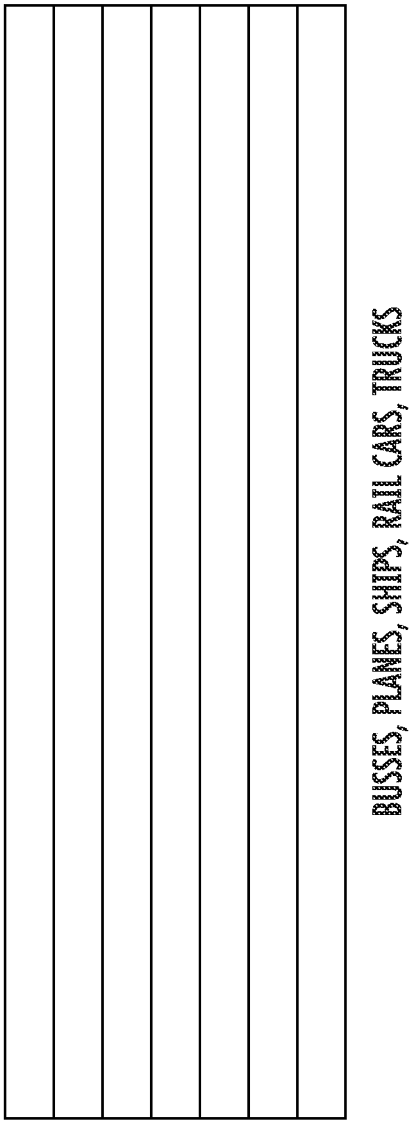
FIG. 4A-B is a schematic diagram of a basic bottom plate structural platform created by joining extrusions by friction stir welding (FSW).
Figure 4B:
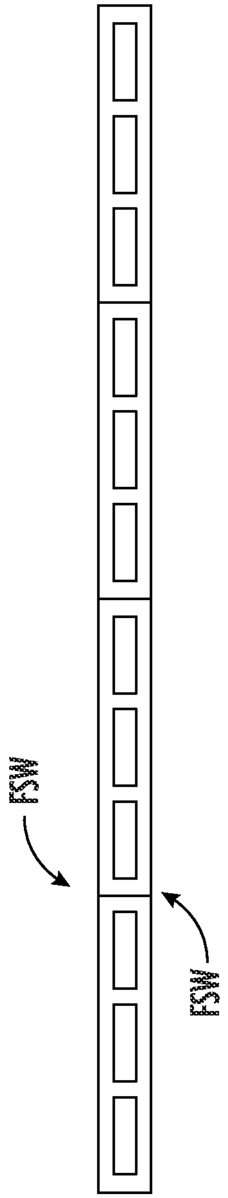

FIG. 4A illustrates a basic load plate, which might be used in buses, trucks, autos, and rail cars, and may form an internal floor or bulkhead in a ship or aircraft. Seen in plan view, it consists of a number of flat planks. FIG. 4B shows an end view of the load plate. In this example, the planks are aluminum extrusions, each with a rectangular profile and three internal cavities. They are joined along their abutting surfaces using friction stir welding (FSW), magnetic pulse welding, or other solid-state welding process.

Example

Figure 5A:
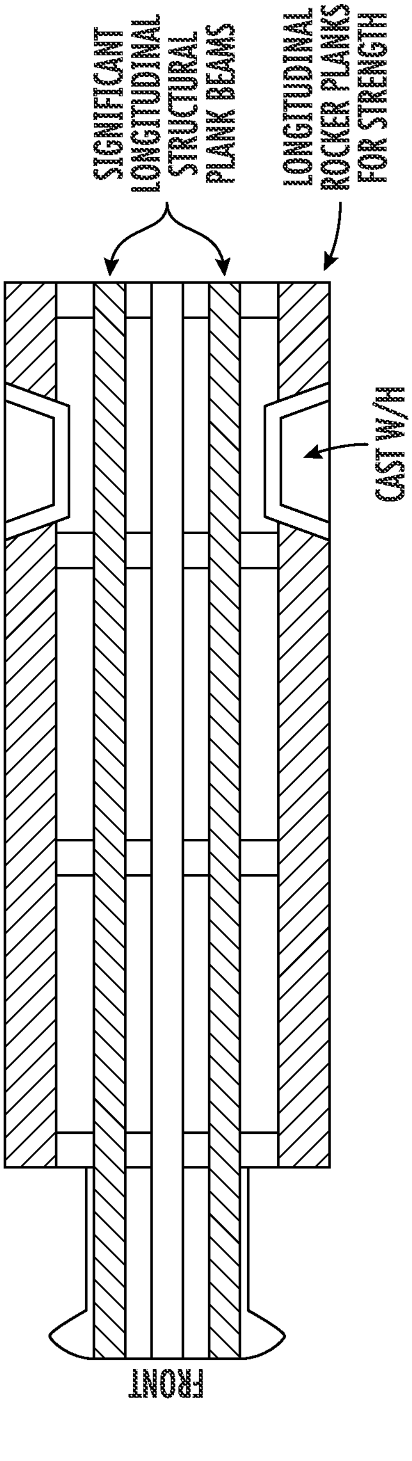
FIG. 5A-B is a schematic diagram of an underbody module for a delivery vehicle made in accordance with some aspects of the invention.
Figure 5B:
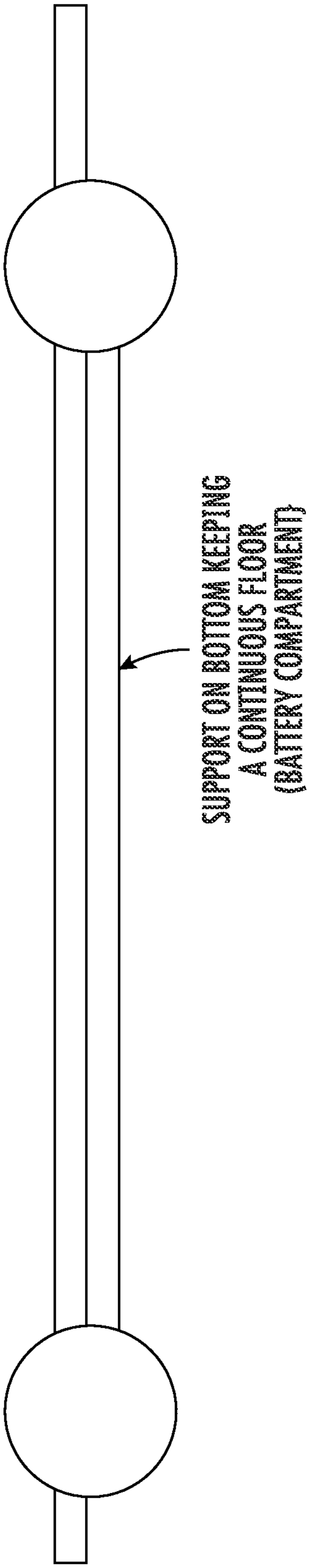

FIGS. 5A-B show a more advanced floor plate, in which some extrusions have a deeper profile to provide greater bending strength in the longitudinal direction. In addition to the FSW aluminum extrusions, other components such as cast aluminum wheel housings or other suspension components may be added at this stage

Example

Figure 6A:
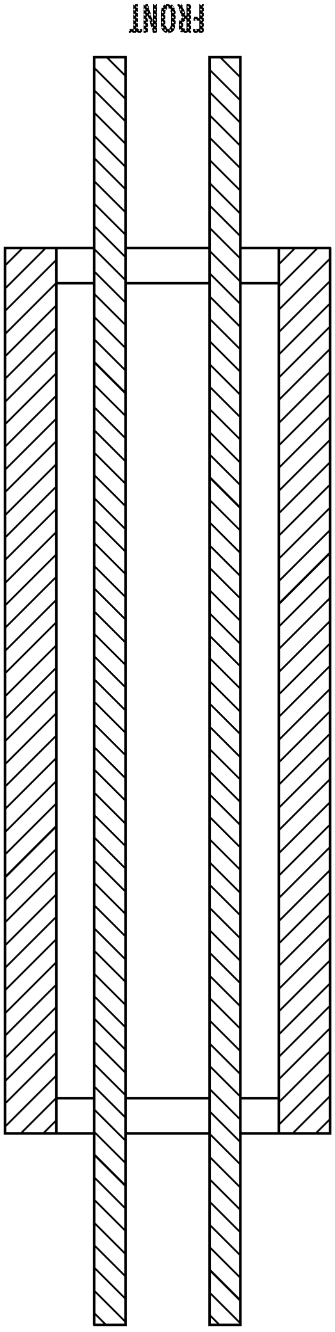
FIG. 6A-B is a schematic diagram of another underbody module for a delivery vehicle made in accordance with some aspects of the invention.
Figure 6B:
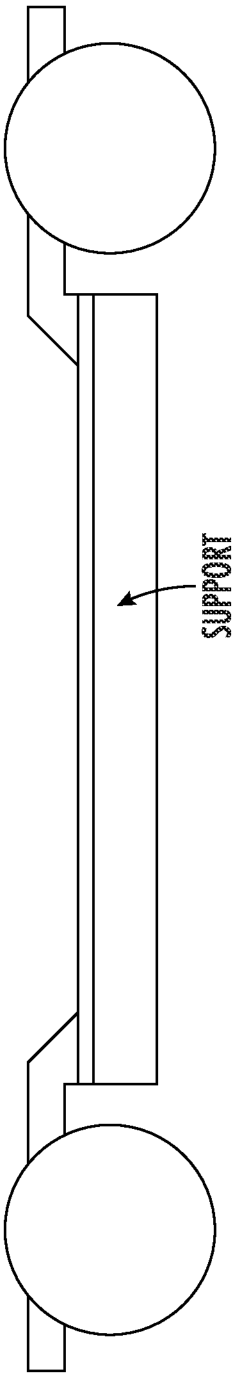

FIGS. 6A-B show another configuration, in which the continuous load floor does not extend completely to the ends of the chassis. Furthermore, as shown in the side view, FIG. 6B, added structural depth may be created by the deeper profile on the two longitudinal structural beams. This added depth may be used to provide a sealed and structurally robust enclosure for holding the battery packs in an electric vehicle.

Those skilled in the art of vehicle design will appreciate that the chassis shown and described in the two preceding examples have some characteristics in common with a skateboard architecture, and at the same time, some characteristics of a unibody architecture once the other modules are joined together. The Invention may further be adapted to make the chassis of a unibody automobile, in which case the floor plate made from extrusions would replace the conventional stamped floor pan. The floor plate would preferably be provided with sills on each side edge to engage with corresponding sills on the body side panels.

It will be further appreciated that the Invention lends itself to making the walls and roof self-locating during the assembly process. The Inventive underbody module is one rigid, continuous product after fabrication, so the final machining when complete would be held to machined tolerances as opposed to stamped tolerances. The wall modules would be handled in much the same way. Both the underbody subassembly and wall subassembly would have the critical datum points machined into the modules; therefore, they would be self-locating to each other such as using a self-centering screw fastener in a particular location at the front and having a slot for driving the screw fastener through at the rear of the wall. This aspect greatly simplifies the assembly process known as framing the body. The framing process is then only responsible for keeping the body from being assembled in a "matchboxed" condition in which some of the corners are not square.

Example

Figure 7C:
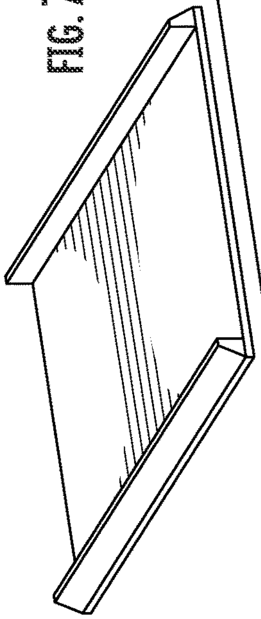
FIG. 7A-D presents a schematic view of a load floor and underbody module in accordance with some aspects of the invention.
Figure 7D:
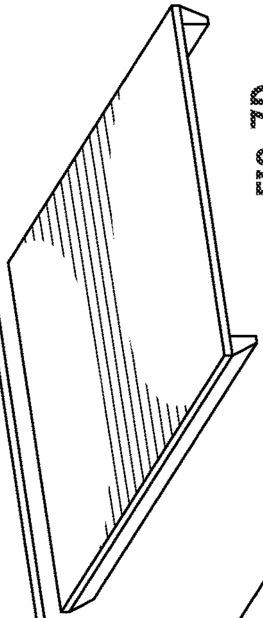
Figure 7B:
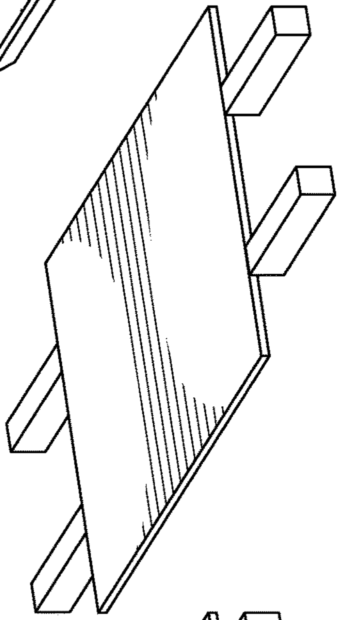
Figure 7A:
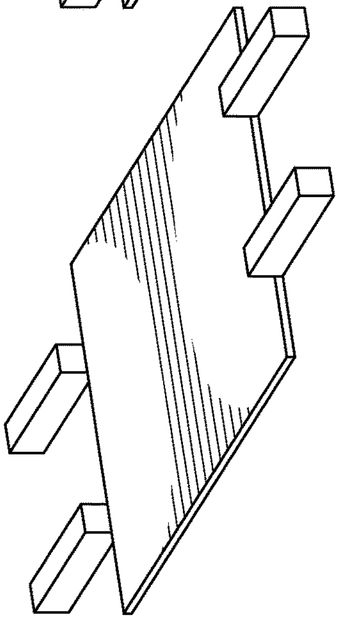

FIGS. 7A-D shows oblique views of several configurations of the load platform/underbody module. In FIGS. 7C-D, side rails are shown either extending upward (FIG. 7C) or downward (FIG. 7D). For electric vehicles, the side rails may be given greater depth as shown generally in FIGS. 17A-B, and may have internal reinforcement or other design features to provide a controlled crumple zone or otherwise provide side impact protection to the battery packs.

Example

Figure 8:
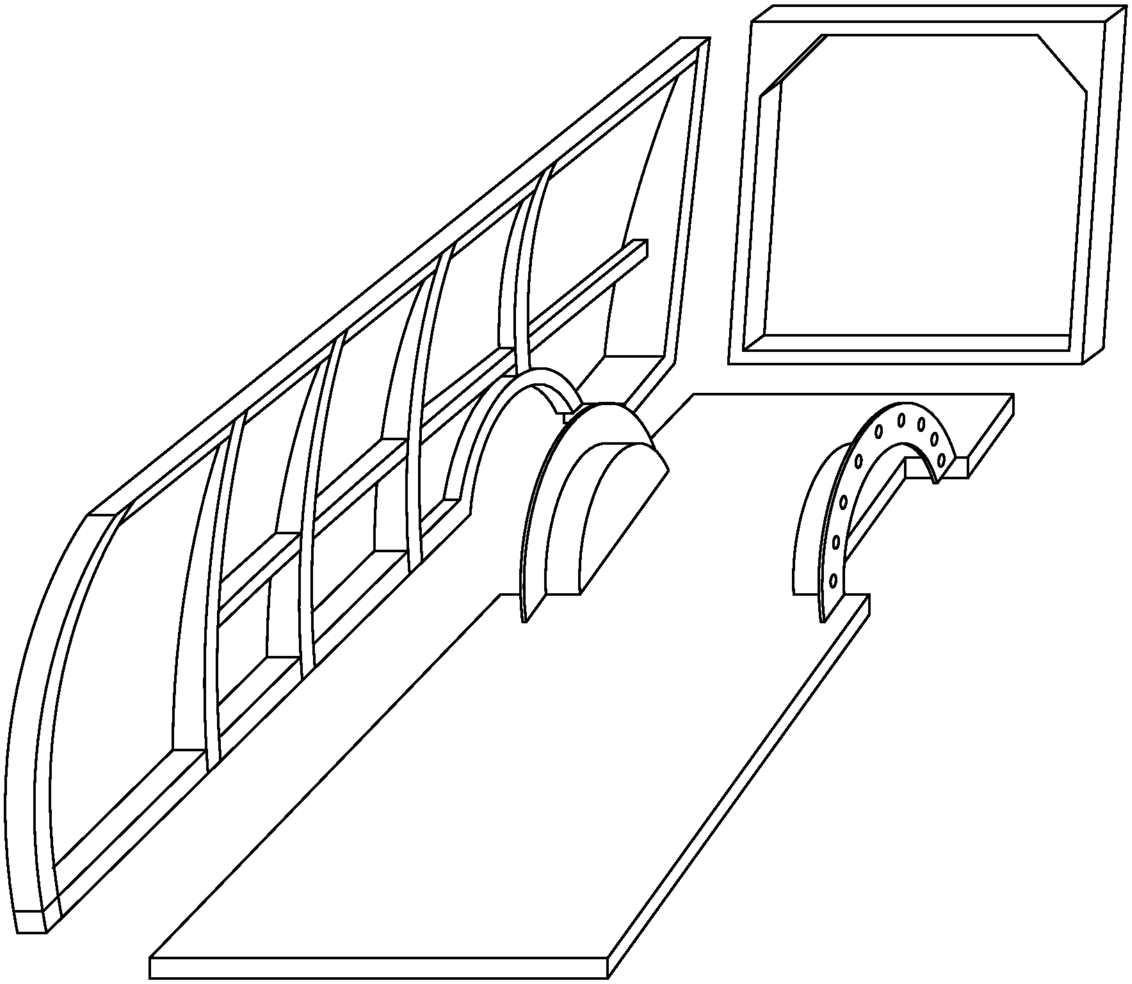
FIG. 8 presents an exploded view of a wall module, a rear module, and a load floor/underbody module in accordance with some aspects of the invention, showing how these modules will be brought together and joined along their mating edges.

FIG. 8 shows an exploded view of the floor module, wall module (one of two) and the rear wall/doorway module. Note that the wall modules may be curved, as shown, or they may be flat, depending on the desired external contours and the desired interior space for a particular vehicle. In this example, cast wheel housings have already been attached to the floor pan.

Example

Figure 9:
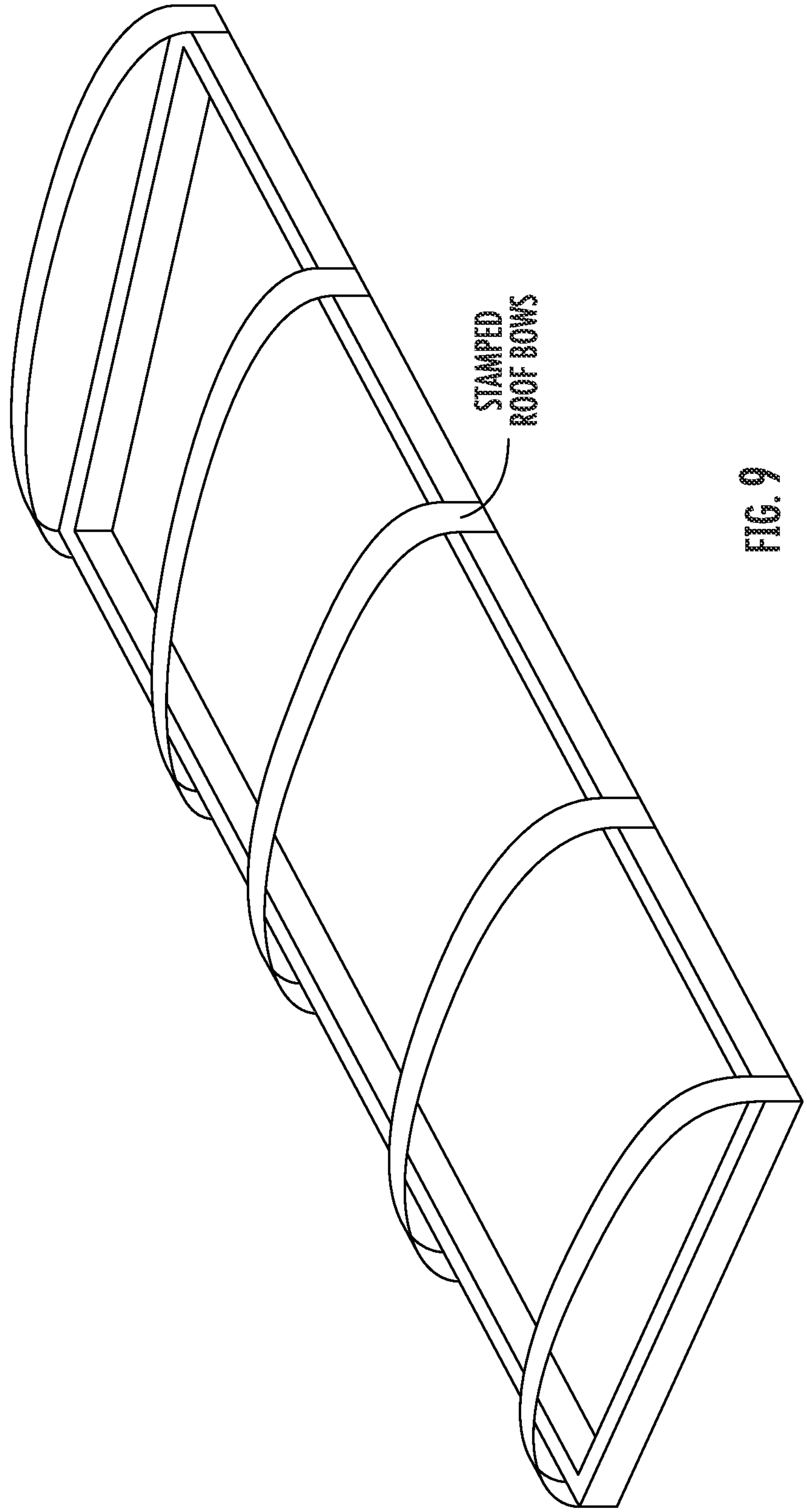
FIG. 9 presents a schematic view of a roof module in accordance with some aspects of the invention.

FIG. 9 shows a roof module comprising extrusions joined together to form a rectangular frame. Roof bows, which may comprise aluminum stampings, can support a skin of any desired sheet material, such as sheet metal, polymer composites, canvas, or the like. In particular, if a translucent roof is specified so that the interior can receive some natural light, flexible translucent fiberglass sheets may be installed. The skin may be affixed to the bows with any suitable fasteners, such as rivets or self-tapping screws, alone, in combination with structural adhesives, or with double sided adhesive foam tapes.

Example

Figure 10A:
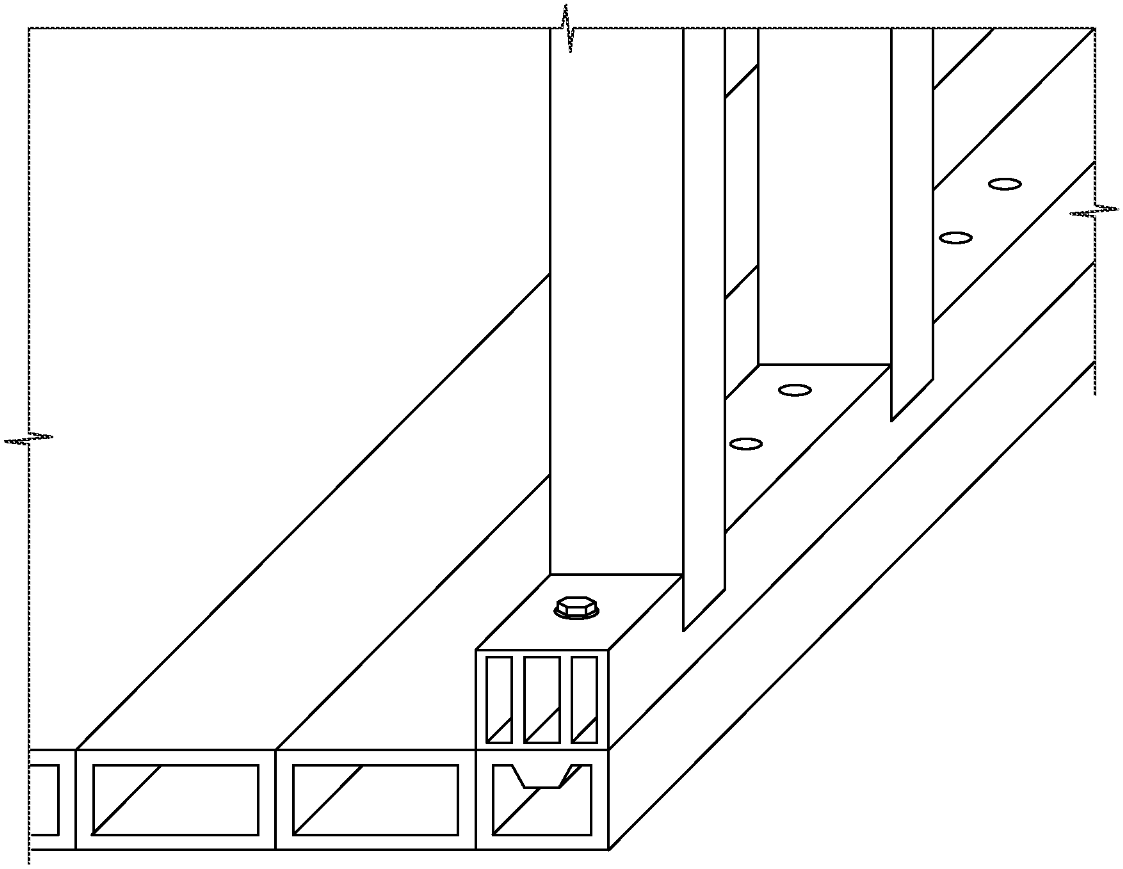
FIG. 10A-B presents a schematic view of one method for joining a load floor/underbody module with a wall module in accordance with some aspects of the invention.
Figure 10B:
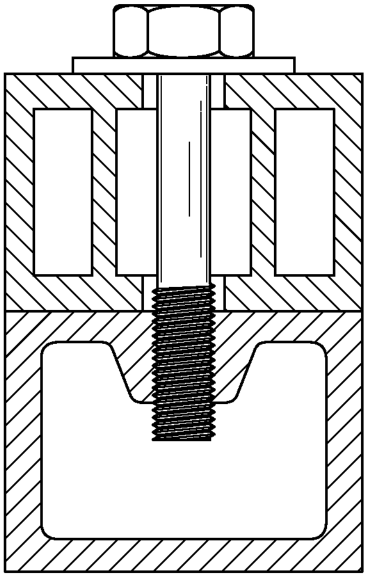

FIG. 10 illustrates one method for joining the wall modules to the underbody module. As in earlier examples, the underbody comprises FSW extrusions. The endmost extrusions on both sides (one is shown here) have a different profile, as shown in detail in FIG. 10B, which preferably is thickened in the center to provide a stronger joint to engage the fasteners, which may preferably comprise trilobular screws, but may alternatively comprise self-tapping screws. For further strength, a layer of structural adhesive may be applied to the bond line. Such adhesive is preferably a thermoset composition, which may be a two-part, room-temperature curing formula (e.g., epoxy), or it may be a one-part formula that is cured at elevated temperature. Means may also be provided to maintain a selected thickness of the adhesive layer as is well known in the art; such means may include washers, raised ribs on the extrusions, incorporation of small glass beads into the adhesive formulation, or other familiar techniques.

All wall and roof modules can be made by creating an extruded aluminum skeletal frame or sections to be sandwiched in a hollow-core composite. The process includes a fiber resin skin layer, hollow-core material, aluminum sections and another resin skin layer to be formed in a heated or microwaved in a mold to cure the composite and form the permanent shape. The process requires skin layers to closely match the thermal expansion of aluminum.

Example

Figure 14A:
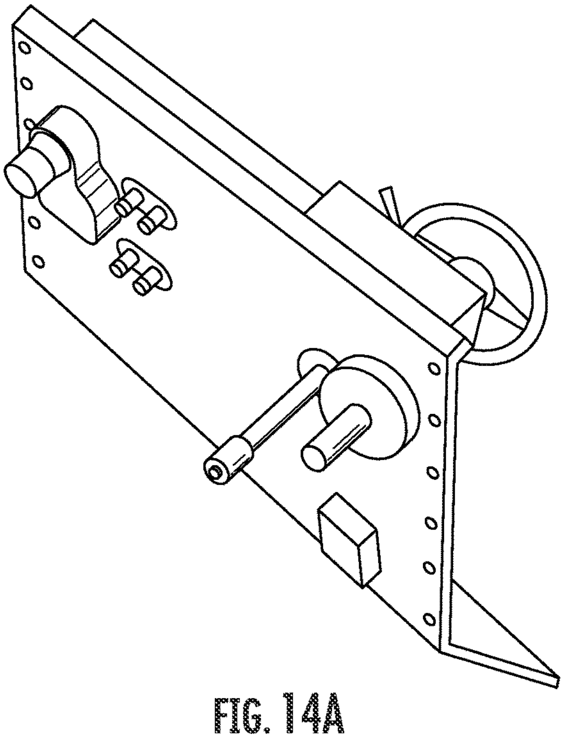
FIG. 14A-B schematically illustrates a dash module, FIG. 14A, with all electrical wiring and modules, heating and cooling module system and connections, steering column and braking pedal hardware, instrument panel support beam, insulation, dash screens and displays, etc. completely preassembled to a metal dash and toeboard panel that would generate the lower flange for the bonded windshield, and would be bolted and bonded to the framed vehicle structure, FIG. 14B from body A-pillars down to the structural floor.
Figure 14B:
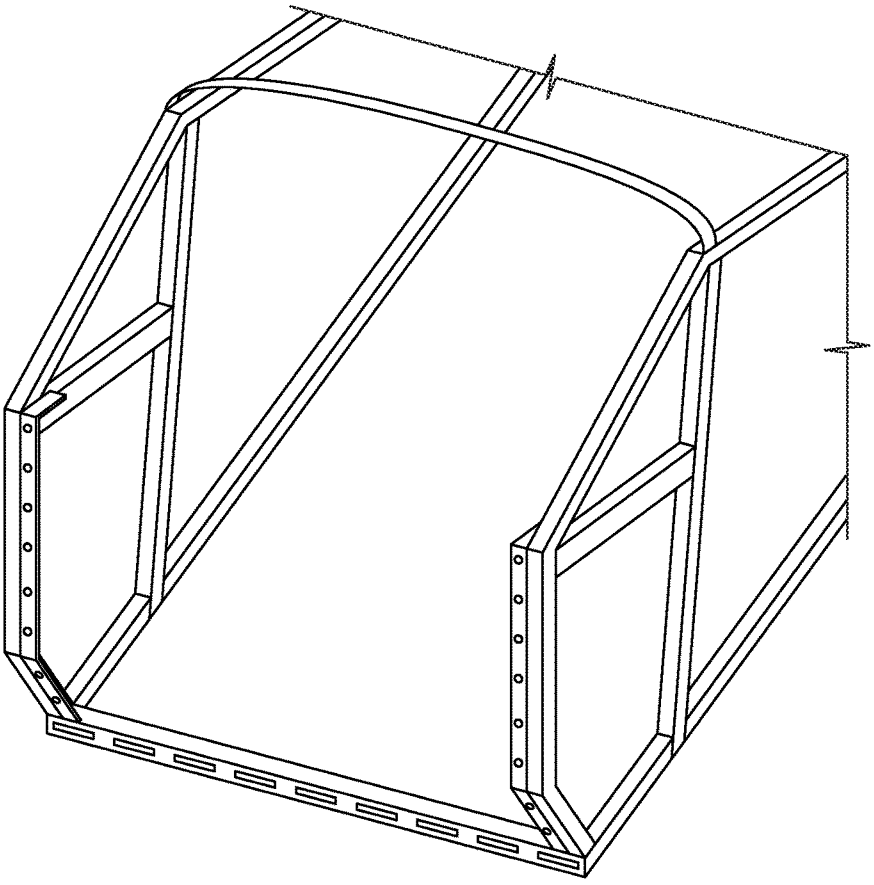

The wall panel known as the front of dash may be made from a stamping or a hollow-core composite. Applicants contemplate that this wall panel and the others can be fully sub-assembled with all components prior to framing and installed as a complete assembly. As shown in FIGS. 14A-B, a pre-assembled front of dash panel with IP, HVAC system, steering, electrical, Brakes, IP beam, etc., FIG. 14A, is set and bolted/bonded to the bodyside/floor/roof assembly, the front portion of which is shown in FIG. 14B.

It will be appreciated that the modular aspect of the body allows each module to manufactured and painted individually and, in some cases, the underbody for instance, may not be painted at all. The repair of such body becomes substantially easier due to the production process availability of the complete painted and possibly fully general assembled modules.

It will be further appreciated that the invention provides a great deal of flexibility in the manufacturing process. In the traditional unibody, FIG. 1, the monocoque is made first. The body then proceeds along the production line and all the interior components such as seats, instrument panel, etc., must be put in through door openings and secured by operators working in cramped quarters. In the invention, by contrast, creating the complete monocoque is done last. This allows the builder to place and install many components before the vehicle is completely enclosed. Seats, for example, could be attached to the underbody platform before attaching the walls. Interior upholstery, shelves, wire runs, etc., could be attached to the wall sections as they are made. Interior lighting, handholds, etc., could be attached to the roof panel before joining to the walls. The rear wall module may be constructed using a common outer frame that will mate with floor, roof, and side wall modules; this outer frame could then contain several door options (overhead, rollup, side-opening, etc.) that a customer can select. The outer frame of the rear wall may also contain preinstalled tail lighting units and their wiring harnesses, which will preferably mate with connectors and wiring runs already positioned in the floor or wall modules.

Applicants prefer to join the individual extrusions that form the floor or underbody module by continuous full-penetration welds along their abutting edges. The welds are preferably done by laser welding or FSW, magnetic pulse welding, or other suitable structural welding technology, and more preferably by FSW. FSW is a familiar method for joining long seams in aluminum plates to make large planar structures, and this method has been used to make load floors for semitrailers, for example. However, for that application, the aluminum structure doesn't provide the main structural support for the trailer; instead it is just replacing wood planks, which form the traditional load floor in most semitrailers, so consequently the individual extrusions are all of the same cross section making it simple to clamp the extrusions together on a flat tool and form the welds. Conventionally, friction stir welding is done on a planar object in which at least one of the two surfaces is flat, so the assembly can be clamped down and easily held in position. However, Applicants contemplate that the different extrusions will have different profiles in order to achieve the necessary flexural strength, provide mounting points where suspension components will be rigidly attached to the underside of the underbody module, and provide mounting rails for joining the wall modules. So the ideal cross section of the complete platform will not be flat on either surface, making it difficult to establish a flat plane for FSW. Applicants therefore contemplate a welding system and fixture that is custom designed for a particular underbody and has a contour on its upper surface that accommodates whatever protuberances have been formed on the underside of the module.

Example

Figure 11A:
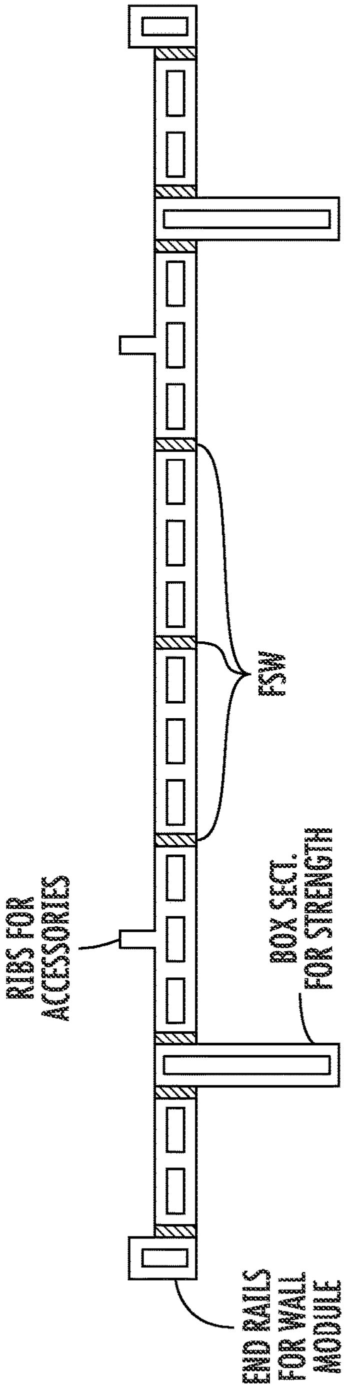
FIG. 11A-B schematically illustrates another load floor module and method for assembling it from individual extrusions having different profiles in accordance with some aspects of the invention.

As shown schematically in FIG. 11A, Applicants contemplate that the extrusions forming the planks of the floor in the underbody module will generally not all be the same. For example, as shown in the drawing, one extrusion profile may be used for the interior planks and a different profile may be used for the edge rails. The cross section of the edge rail may be provided with a thickened rib to provide added material for engaging a trilobular screw or other self-tapping fastener, as previously shown in FIG. 10B. One or more of the interior planks may be substantially deeper to provide torsional strength in the longitudinal direction. Some extrusion profiles may include a raised rib that may later be partly removed (typically by milling) to leave raised tabs or bosses for attachment points or other purposes. One can see from FIG. 11A that all of the FSW lines ideally lie in a common plane, but the cross section of the assembly as a whole does not lend itself to being clamped onto a flat surface, either as shown or when turned face-down.

Example

Figure 11B:
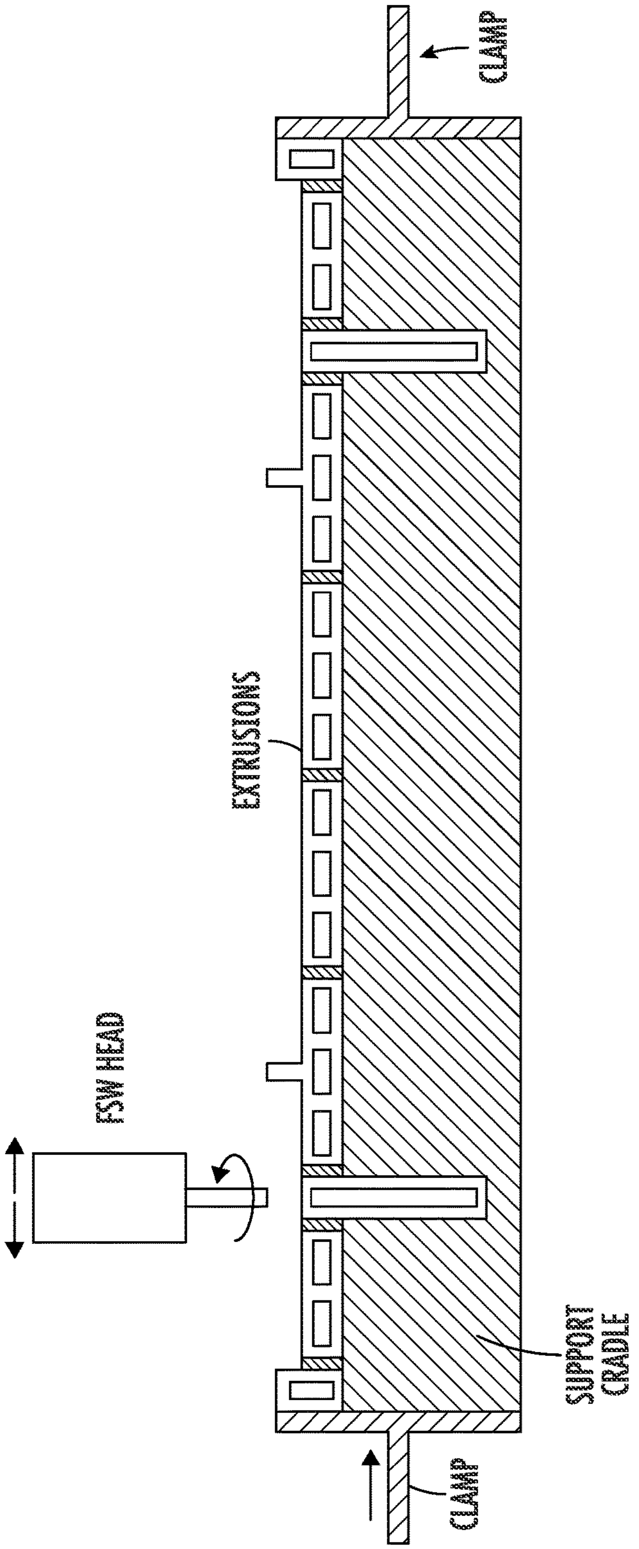

Applicants therefore contemplate using a fixture or cradle, as shown schematically in FIG. 11B, and having a top surface that conforms to the underside of the extrusions so that all the FSW lines are essentially coplanar. The extrusions are clamped into place, preferably both laterally (as shown) and downwardly onto the fixture (not shown) to prevent shifting, misalignment, or warping during the completion of all the FSW seams.

Example

Figure 12:
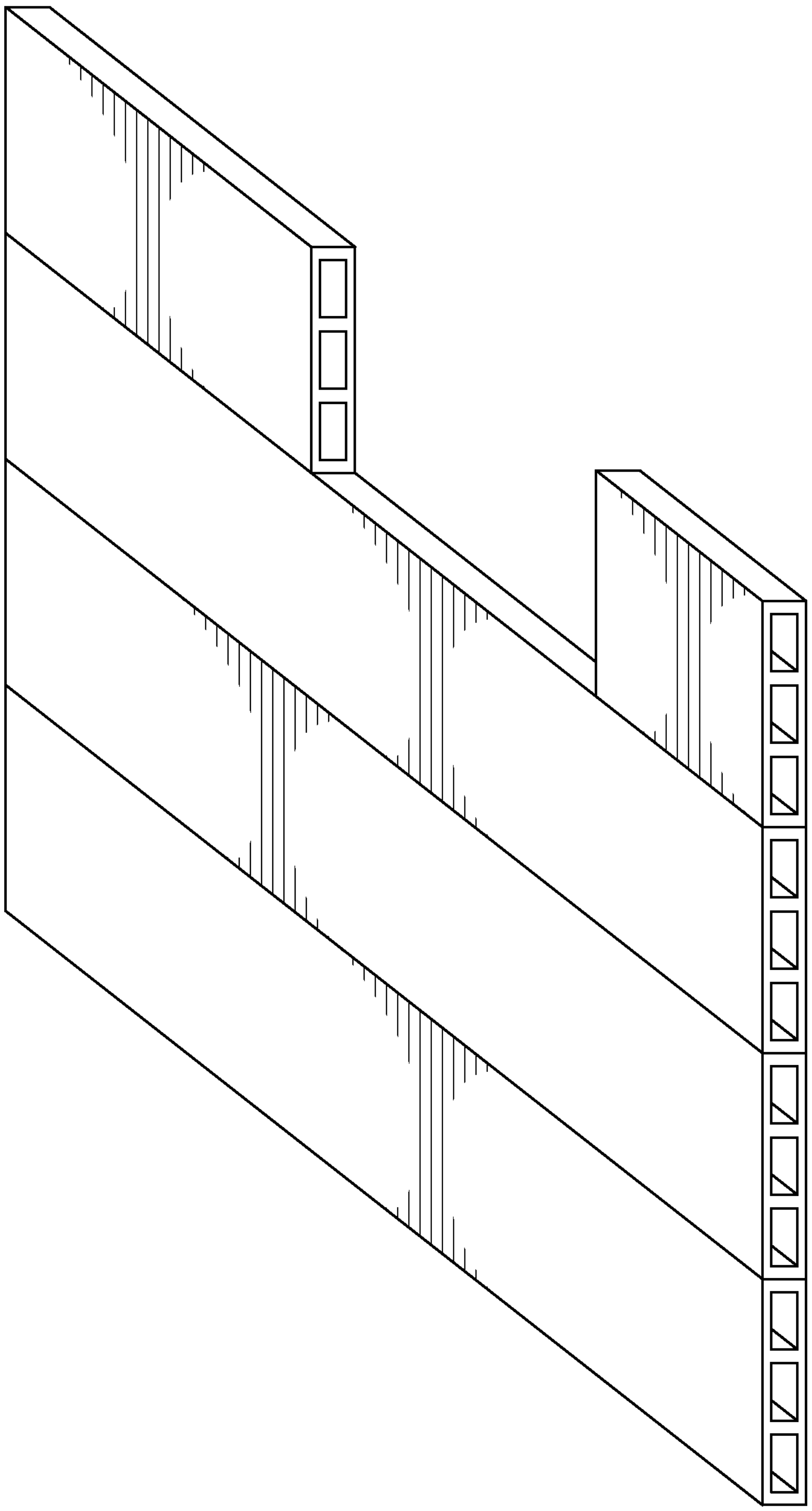
Figure 13:
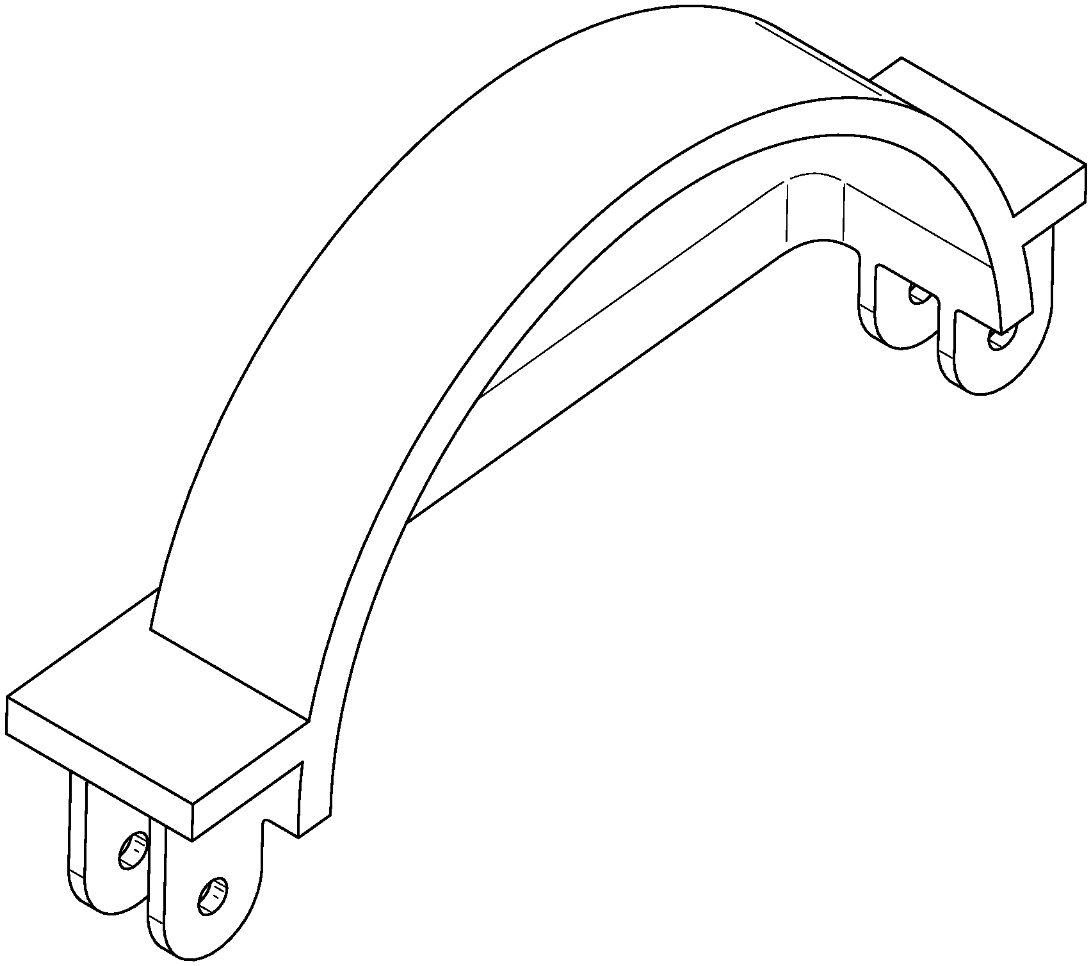
FIG. 13 schematically illustrates a wheelhouse casting to mate with a load floor module in accordance with another aspect of the invention.

The underbody module may further contain structural components attached by welding, mechanical fasteners, structural adhesives, or other familiar means. Such components may be die castings, sand castings, forgings, machined parts, and welded subassemblies. They may serve as mounting points for various other modules such as suspension assemblies, spring mounts and shackles, etc. FIGS. 12-13 illustrate one example of this aspect of the invention. FIG. 12 shows the load floor after friction stir welding. Shorter planks may be used in one area to create an opening. A wheelhouse casting, FIG. 13 includes a perimeter flange to transfer suspension loads to the FSW floor plate, and also has attachment points for the suspension bushings, which may be trunnions, clevis plates, or bow tie mounts as are familiar in the art.

Shorter planks may also be arranged to create a space in the middle of the front end of the underbody module to accommodate a forged or cast component welded into place to form the transmission tunnel in the case of an ICE powered vehicle. Those skilled in the art will appreciate that the Inventive assembly process can therefore be viewed as a form of additive manufacturing where the builder will weld in extrusions only of the lengths needed and then attach castings and other elements where they are needed.

Figure 15A:
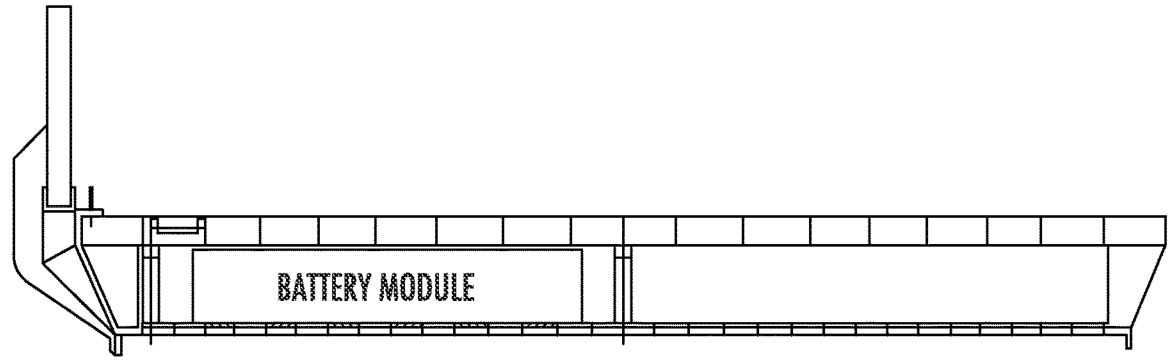
FIG. 15A-D schematically illustrate an underbody serving as part of a battery enclosure on three sides of the battery pack to be installed from below. The assembled system is shown in FIG. 15A.
Figure 15B:
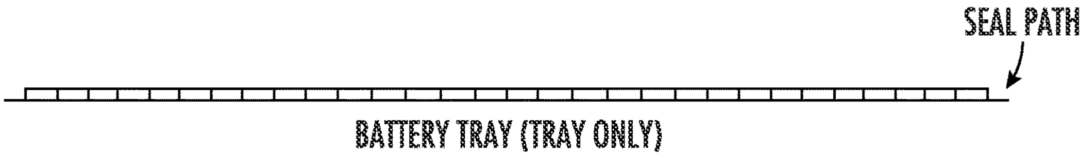
Figure 15C:
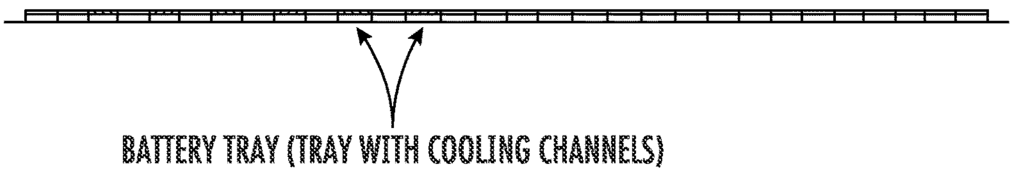
Figure 15D:
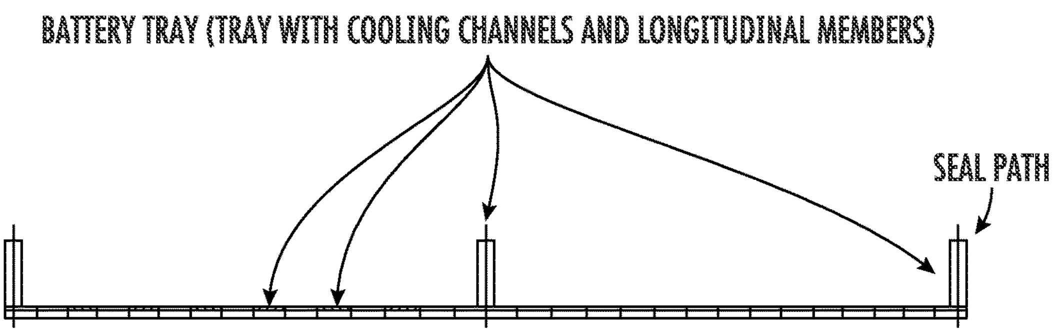

Applicants contemplate that the proposed underbody can function as the enclosure on three sides of the battery pack to be installed from below, as shown schematically in FIGS. 15A-D. The assembled system is shown in FIG. 15A. The battery tray or enclosure would include a rigid aluminum battery floor, FIGS. 15B-D the floor comprising a load tray and sides comprising structural extrusions oriented longitudinally with members including fastener channels for battery module fastening. The tray longitudinal members would be sealed at the ends and designed to carry the coolant to the modules in the floor or provide the cooling itself. Additional chambers could be filled with insulating foam. FIG. 15A shows the location of one battery module; it will be appreciated that another may be located in the adjacent space, to provide greater range and more even weight distribution.

Figure 16A:
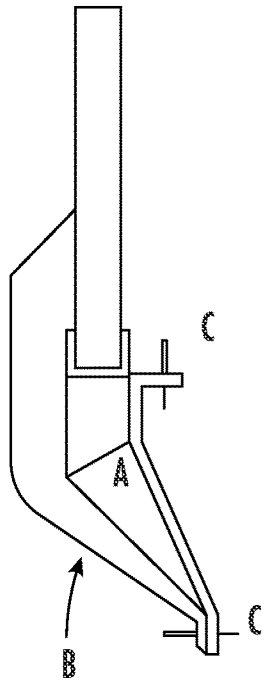
FIG. 16A-C schematically illustrates some details of the junction of floor and sidewall when a battery compartment is present.
Figure 16B:
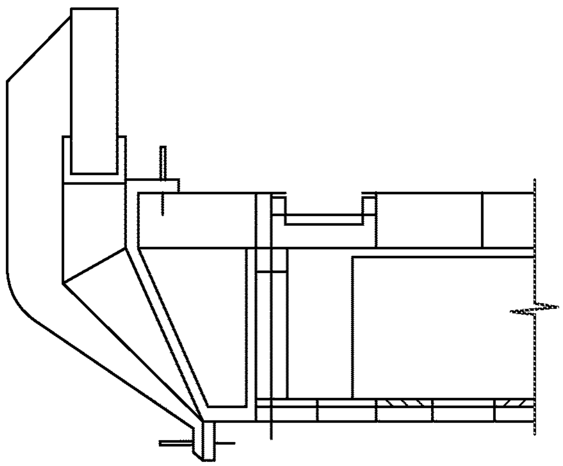
Figure 16C:
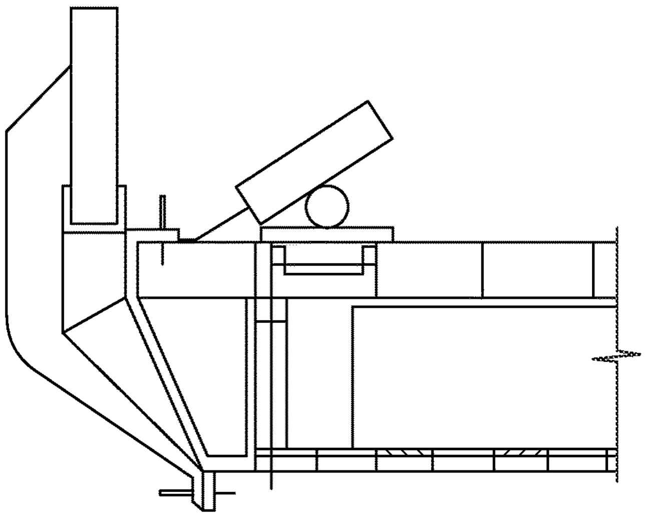

FIGS. 16A-C illustrate further details of the junction of floor module and wall module where a battery compartment is provided. In FIG. 16A, Item A is the framework (extrusions and stampings); Item B is skin (stamping or composite) bonded and/or joined to framework; Item C represents fasteners in both horizontal and vertical planes as required by design (adhesive in these paths). FIGS. 16B and 16C show, respectively, the use of tracks for tie downs and covers, and the use of a track to guide a tool.

Applicants further contemplate that the channels in the underbody extrusions can potentially be filled with foam material for both insulation and reduction of noise, vibration, and harshness (NVH). One or more of the extrusions may have openings on one surface to allow the interior space within the extrusion to serve as a cable run.

The modular nature of the inventive unibody system allows a manufacturer to customize a truck for particular uses or customers. The following table summarizes some of the options one can choose.

| | | | |
|---|---|---|---|
| Select underbody | Size | Load capacity | Wheels and tires |
| Select side walls | Height and Length | Configuration (solid or windowed) | Skin (solid or mesh, rails, material, surface finish) |
| Select front wall | Height and width | Configuration (flat or aerodynamic) | Skin |
| Select rear wall | Height and width | Configuration (doors, tailgate, light package) | Skin |
| Select roof | Area is fixed by underbody dimensions | Configuration (flat or aerodynamic) | Skin (opaque or translucent) |
| Select interior | Lights | Wall finishes, floor finishes, appliance prep, etc. | Furnishings (camper prep, etc.) |

Example

Figure 18:
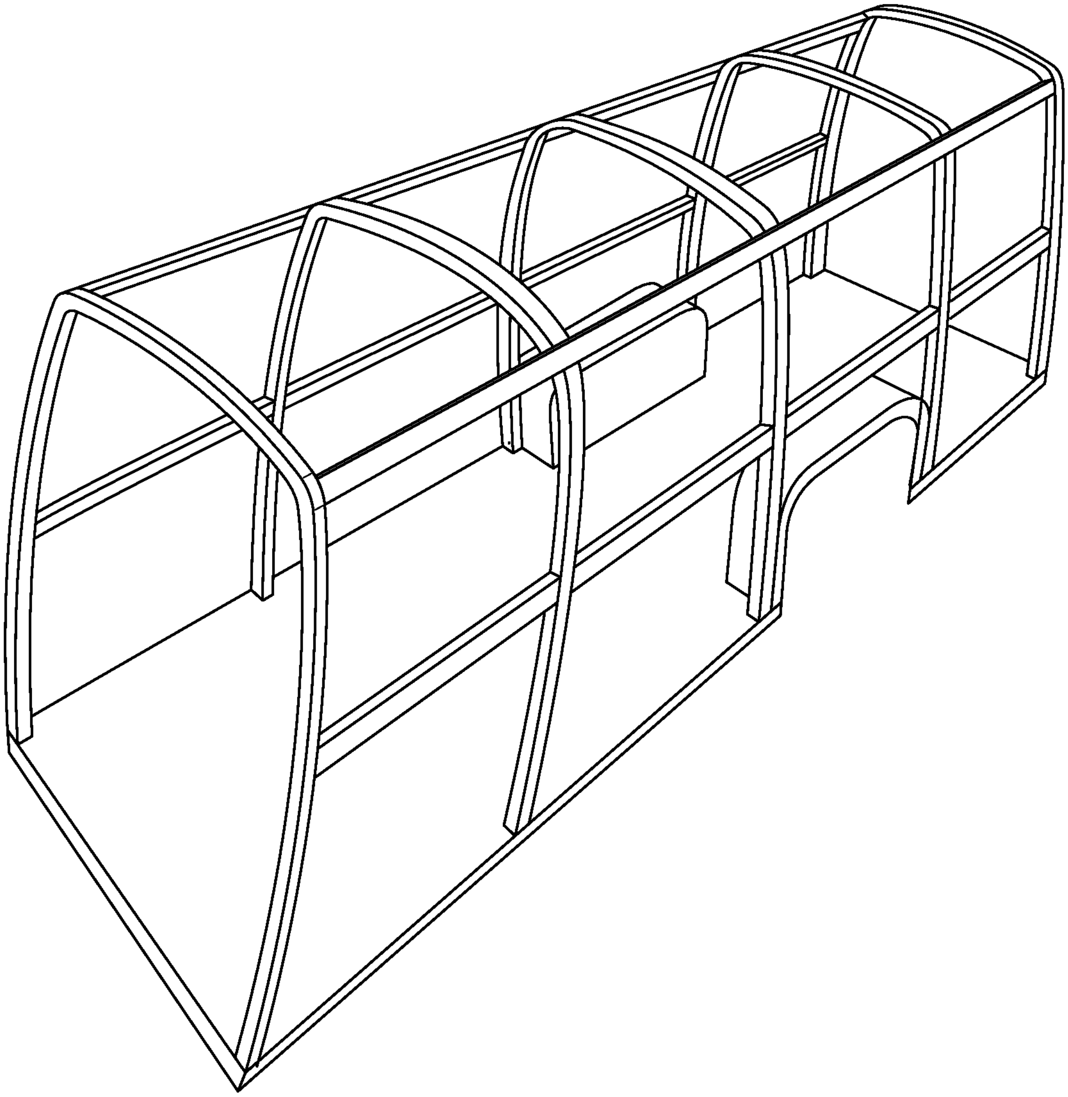
FIG. 18 shows the unibody framework for a small bus or an RV frame in accordance with some aspects of the invention.
Figure 19:
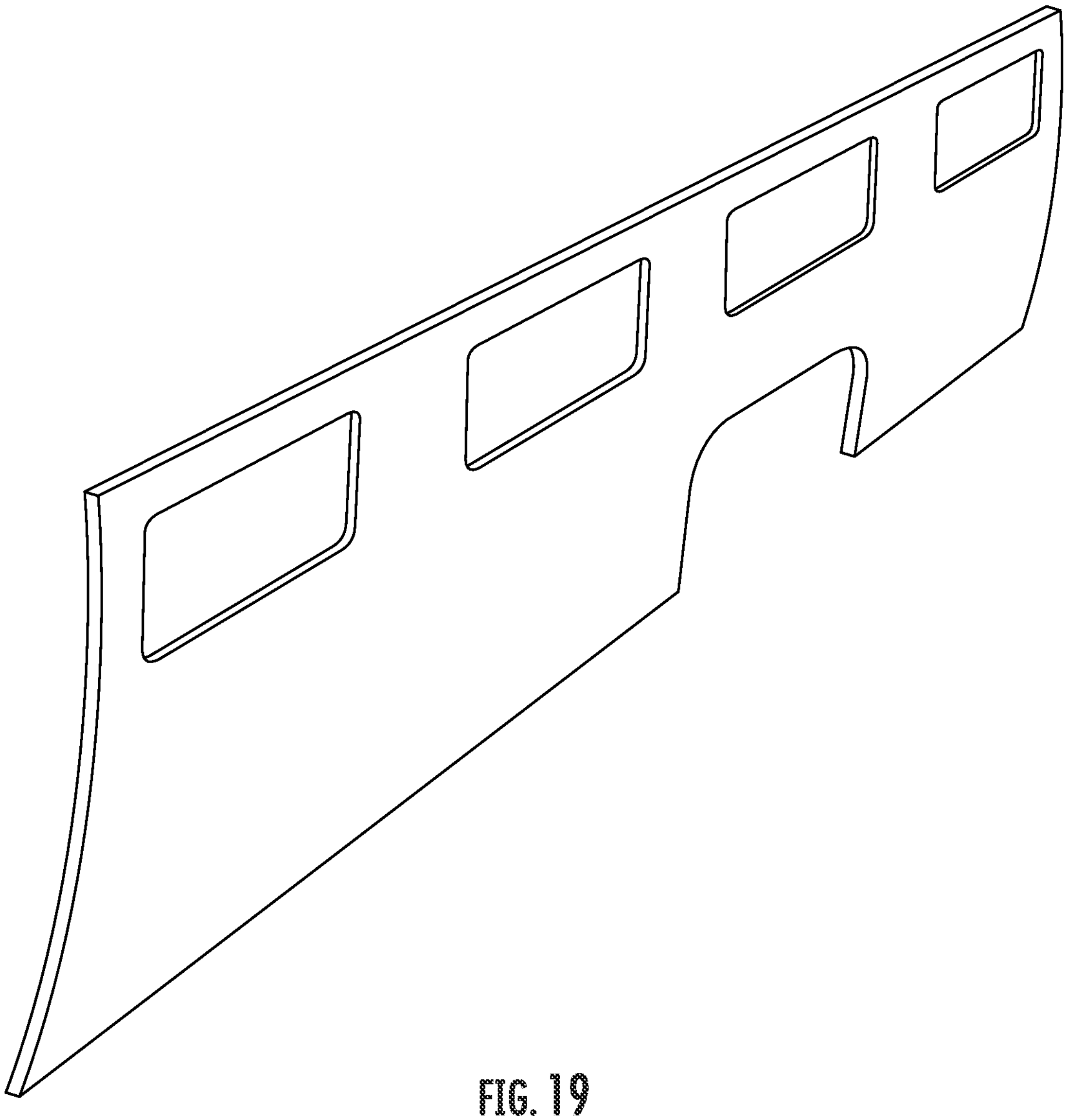
FIG. 19 shows a left side wall module for the same vehicle structure as the chassis shown in FIG. 18. The skin could be one large metal stamping or smaller stampings depending on available coil widths. The metal panel(s) could be riveted or welded to the framework or adhesively bonded to the structure shown in FIG. 18. The panel skin(s) could also be made from composites and would be joined with two-sided tape, or very low modulus adhesive.
Figure 20:
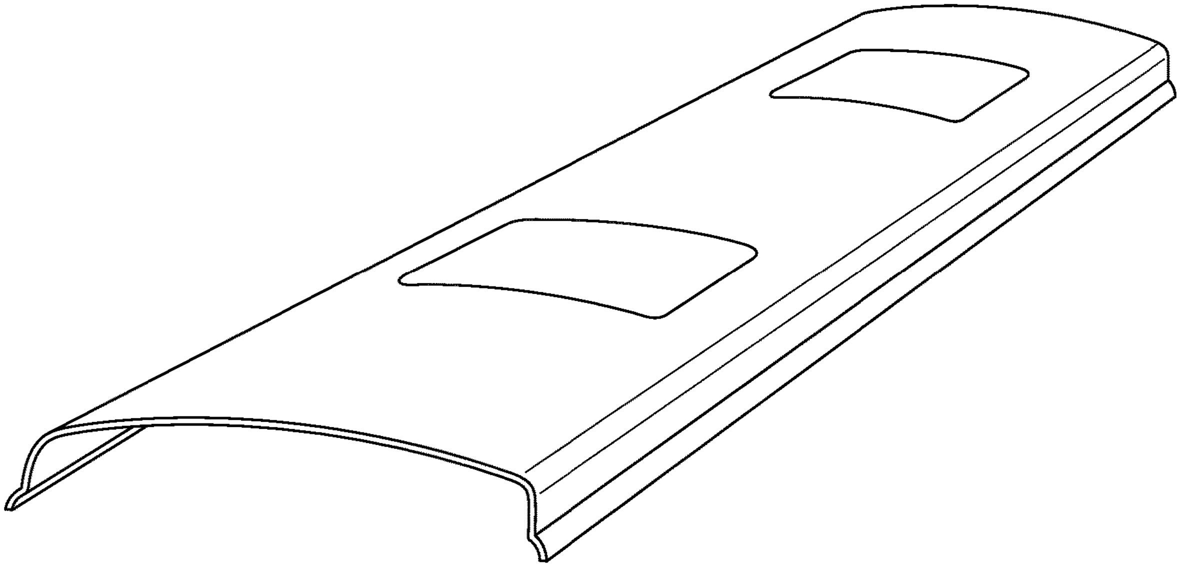
FIG. 20 shows the roof skin for the same vehicle chassis structure shown in FIG. 18. The skin could be one large metal stamping or smaller stampings depending on available coil widths. The metal panel(s) could be riveted or welded to the framework or adhesively bonded to the structure shown in FIG. 18. The panel skin(s) could also be made from composites and would be joined with two-sided tape, or very low modulus adhesive.

The inventive concept can also be applied to vehicles such as small buses, as shown schematically in FIGS. 18-20. FIG. 18 shows the unibody framework for a small bus; FIG. 19 shows one side wall module for the same vehicle. FIG. 20 shows the roof module for the same vehicle.

Example

All-terrain vehicles (ATVs) and utility task vehicles (UTVs) often have a floor pan and a tubular space frame, which may be mostly open and serves, in some cases, as a roll cage. Such a structure lends itself well to the Inventive manufacturing process.

Although many examples described herein pertain to the use of aluminum, and more particularly to aluminum extrusions, the invention is not limited only to aluminum alloys nor is it limited only to extrusions. In particular, the basic structural assembly concept may also be achieved using roll-formed steel sections that would be joined to create hollow longitudinal box sections (analogous to the previously described aluminum extrusions) by any suitable joining process, preferably brazing.

Example

Advanced high strength steels up to 1700 MPa, with grade and gauge variation possible in the same set of tooling, are manufactured by Shape Corp., Grand Haven, MI. Roll formed steel components are also manufactured in a variety of sizes and shapes by Advanced Vehicle Assemblies, Rochester Hills, MI, and by voestalpine Roll Forming Corporation, Shelbyville, KY.

Example

Roll formed steel tubes may be joined by any of several brazing processes, such as MIG brazing and plasma brazing.

MIG brazing operates much like MIG welding, but the wire is typically silicon bronze, with a melting temperature of 840° F.; therefore the base metal is not melted. One suitable wire material is ML CuSi3 (MIGAL.CO GmbH, Wattstrasse 2, 94405 Landau/Isar, Germany). When using Si bronze alloys it is recommended that pure argon should be used as the cover gas.

Plasma brazing may employ either pulsed or continuous arc currents. Flat- and vertical-down welding positions are recommended. In opposite to MIG brazing the filler wire is fed into the arc without any current into the focused arc. The deposit of the filler wire is therefore (nearly) independent from the heat input. This makes the seam geometry variable within large boundaries. Plasma brazing with current on the wire is called Plasma hotwire brazing. This variant differs basically only in the additional power provided by another current through the wire. The increased temperature of the filler wire can be used to increase the brazing speed and reduce distortion.

The modular trailer chassis and body system.

The modular design concept of the invention may also be adapted to the construction of small trailers, where several elements of the design make it very easy to configure a trailer to order, even as far as providing options and modifications that may be installed by a local dealer. At the factory, trailer length is selected by the length of the extrusions forming the load platform and underbody, and the width is selected by the number of extrusions laid side-to-side and then welded together. The two outermost extrusions (on the left and right sides of the platform) are preferably constructed as in the previous example of the modular truck, to include structural reinforcements for the attachment of selected side wall modules.

Side wall modules may be factory-built in various heights, with or without solid side panels. Roof modules may also be factory-built, and all modules will preferably have common elements on their mating edges so that a trailer can be configured completely at the factory, or a trailer may be configured at the dealership using factory-supplied modules so that a customer may select a particular configuration or customize a basic configuration in various ways. For example, wall modules may be full height and the skin may be sheet metal, polymer composite, wood composite, or other suitable sheet material. Alternatively, wall modules may be only a foot or more in height and may comprise open frames offering convenient tie down points, or may be covered by a solid skin, expanded mesh, or other surface as needed by the user. The roof module may be covered with an opaque material (sheet metal, polymer composite, wood composite with a polymer outer skin, etc.) or it may be covered with translucent fiberglass or similar material to provide usable natural light inside the trailer.

It will be appreciated that applying the inventive concepts to the design of a trailer chassis creates the equivalent contrast of BOF vs Unibody in vehicles. Traditional trailer manufacturing requires a frame section and a load floor attached to a "body" that typically contributes little to the overall stiffness and rigidity.

Trailers are manufactured in many configurations and weight classes (see https://www.curtmfg.com/trailer-weight for a detailed discussion of trailers and towed campers trailers, the entire contents of which are incorporated herein by reference for background purposes). Data for many trailers are presented in the following table.

| Trailer Type | Average Empty Weight (lbs.) | Empty Weight Range (lbs.) | GVWR (lbs.) | Average Load Capacity (lbs.) |
|---|---|---|---|---|
| Canoe/Kayak Trailer | 200 | 100 to 400 | 200 to 800 | 200 |
| Jet Ski Trailer | 300 | 100 to 500 | 800 to 3,000 | 1,500 |
| Motorcycle Trailer | 500 | 300 to 800 | 1,300 to 3,500 | 1,900 |
| Fishing Boat Trailer | 600 | 200 to 1,100 | 900 to 6,000 | 2,700 |
| Tow Dolly | 600 | 400 to 800 | 3,000 to 5,000 | 3,400 |
| Small Open Utility Trailer | 700 | 300 to 1,100 | 1,000 to 3,000 | 1,800 |
| Small Enclosed Utility Trailer | 1,000 | 400 to 1,800 | 2,000 to 7,000 | 2,200 |
| Teardrop Trailer | 1,700 | 500 to 3,200 | 2,000 to 4,000 | 700 |

-continued

| Trailer Type | Average Empty Weight (lbs.) | Empty Weight Range (lbs.) | GVWR (lbs.) | Average Load Capacity (lbs.) |
|---|---|---|---|---|
| A-Frame Camper | 1,700 | 1,200 to 2,300 | 2,500 to 3,600 | 1,200 |
| Car Trailer | 1,900 | 1,500 to 2,800 | 6,000 to 15,000 | 7,100 |
| Large Boat Trailer | 2,200 | 1,100 to 4,400 | 5,400 to 34,400 | 11,400 |
| Pop Up Camper | 2,300 | 1,400 to 3,000 | 2,700 to 4,000 | 1,100 |
| Large Enclosed Utility Trailer | 2,700 | 900 to 5,200 | 3,000 to 10,000 | 4,400 |
| Small Travel Trailer | 2,800 | 1,200 to 3,900 | 1,900 to 4,500 | 800 |
| Small Horse Trailer | 2,900 | 2,300 to 3,900 | 7,000 to 8,000 | 4,300 |
| Large Flatbed Trailer | 3,000 | 500 to 7,700 | 2,900 to 26,000 | 7,400 |
| Dump Trailer | 4,500 | 1,100 to 10,100 | 3,000 to 30,000 | 12,400 |
| Large Travel Trailer | 6,700 | 4,500 to 8,700 | 6,300 to 10,500 | 1,600 |
| Gooseneck Flatbed Trailer | 7,200 | 4,700 to 10,400 | 15,900 to 36,000 | 16,000 |
| Large Livestock Trailer | 7,300 | 4,200 to 10,900 | 14,000 to 24,000 | 11,400 |
| Toy Hauler | 7,600 | 3,600 to 11,400 | 14,700 to 22,500 | 10,300 |
| 5th Wheel Camper | 12,700 | 5,000 to 16,000 | 17,000 to 20,000 | 6,000 |
| Average Empty Weight (lbs.) | Empty Weight Range (lbs.) | GVWR (lbs.) | Average Load Capacity (lbs.) | |
| Canoe/Kayak Trailer | 200 | 100 to 400 | 200 to 800 | 200 |
| Jet Ski Trailer | 300 | 100 to 500 | 800 to 3,000 | 1,500 |

It will be appreciated that the modular trailer may further include interior modules to form a camper, or may be outfitted with various fittings on the wall modules in a "camper prep" format so that it is ready for a dealer or user to customize and furnish into a selected camper interior. Trailer floors for the purpose of enclosed trailers, in particular for RV types, can be manufactured and machined creating precise locations for passing plumbing or wiring through the floor where needed and are preferably designed to use standard grommets for sealing these locations. This aspect of the invention eliminates a shortcoming in the current coach building process, which is typically done manually using templates; openings are often hacked out, and not sealed, leaving large openings for insects and vermin to enter.

Furthermore, additional tracks can be designed into the floor for mounting requirements, hidden wire ways with snap lids, and/or tie-down needs. As in the truck chassis, the floor channels can be foam filled for insulation and NVH reduction.

The foregoing process of customization may thus be described as shown in the following table.

| | | | |
|---|---|---|---|
| Select underbody | Size | Load capacity | Wheels and tires |
| Select side walls | Height | Configuration (solid or windowed) | Skin (solid or mesh, rails, material, surface finish) |

-continued

| | | | |
|---|---|---|---|
| Select front wall | Height | Configuration (flat or aerodynamic) | Skin |
| Select rear wall | Height | Configuration (doors, tailgate, light package) | Skin |
| Select roof (optional) | Area is fixed by underbody dimensions | Configuration (flat or aerodynamic) | Skin (opaque or translucent) |
| Select interior | Lights | Wall finishes, floor finishes, appliance prep, etc. | Furnishings (camper prep, etc.) |

There is a growing interest in powered travel trailers that have an on-board battery pack and motors, in order to avoid reducing the range of the tow vehicle [see, e.g., the L1 Travel Trailer, Lightship RV, San Francisco, CA]. The inventive trailer architecture may also be adapted to this application, replacing the ladder chassis used in conventional products. In this case, the space between the two longitudinal structural members again serves as part of a battery enclosure and the interior space of one or both members may serve as a cable run or accommodate coolant piping.

Example

A load floor and underbody would be formed as described earlier using longitudinal extrusions and containing an integral battery enclosure. Two axles incorporating electric drive systems are preferably mounted to the underbody such that a user may adjust the position of one or both axles, thereby increasing or decreasing the wheelbase in order to optimize ride characteristics and maneuverability. Side walls and other body modules would be attached as described earlier to form the complete vehicle.

Applicants contemplate that the drive control system will preferably communicate with that of the tow vehicle, whether the tow vehicle is an EV or is ICE-powered, so that the two vehicles are coordinating their speed, braking, etc. The communication system may be wireless or may comprise a detachable cable physically connecting the tow vehicle and trailer. A separate control system, e.g., a hand-held module, may be provided so that a user can independently guide the trailer into a parking space or garage.

Communication with the tow vehicle would typically exploit the tow vehicle's OBD port to obtain wheel speed data, torque demanded data from the ECU based on the accelerator pedal position, etc.; brake pedal position and brake pressure data would be obtained from the ABS controller, and there would be data on the Controller Area Network (CAN bus) on deceleration levels and acceleration levels in terms of g forces from the Electronic Spark Controller (ESC) or vehicle stability controller, and so on. One could monitor messages from the various sensors and modules exchanging info over the tow vehicle CAN bus to gain near real time access through the CAN bus OBD connector port. In turn those CAN signals may be sent through a wireless connection from an OBD CAN connector/relay module to the trailer powertrain controller, telling it how much power and speed to command, either positive for acceleration or negative for braking or deceleration. Those skilled in the art will appreciate that carefully developed firmware will be needed to avoid instabilities that arise from latency and differences in response time. The challenge is to have firmware to work with specific tow vehicles. Each OEM has proprietary CAN messages and these must be available to develop a control program for the powered trailer, allowing for difference in latency, driveline backlash, etc.

Alternatively, the drive control system on the trailer may be configured to have some degree of autonomy to allow the trailer to respond to conditions as they arise. For example, the tongue may be fitted with one or more load cells so that the trailer can apply more or less power to the wheels to minimize tension or compression on the tongue as a way to match trailer and tow vehicle. In the event that the tow vehicle suddenly decelerates, compression on the load cell would signal the trailer drive system to engage regenerative braking, and in extreme conditions to apply brakes as well. Furthermore, the tongue may contain other load cells to detect moments that indicate the tow vehicle is turning, and these signals can cause the trailer drive system to increase the drive level on one side or the other to minimize the lateral load on the tongue and thereby work cooperatively with the tow vehicle to execute turning maneuvers.

Further examples and variations of the invention.

A vehicle body may include a rigid aluminum frame, the frame comprising:

- a load floor and underbody comprising structural extrusions oriented longitudinally;
- subassemblies comprising aluminum extrusions formed into frames defining the body walls; and,
- at least one subassembly comprising aluminum extrusions formed into a frame defining the body roof, and wherein the load floor, wall subassemblies, and roof subassembly are fastened together to form a rigid final assembly.

The extrusions may be any suitable aluminum alloy as are familiar in the art. Common aluminum extrusions used in vehicle structures are 6063, 6005, 6105, 6061, 6082, 6110 and some custom alloys with special additions or tighter chemistry specs. The invention could also make limited use of 7003 and 7046 extrusions, with the understanding that they are more expensive to extrude and offer much lower corrosion resistance than 6XXX series grades. So they would preferably be used more in vehicle sides and roof modules where higher yield strength could be exploited without risk of exposure to corrosion.

Each module or subassembly may be formed by placing individual extruded components into a locating fixture and securing the joints using any conventional means, including rivets, screws, structural adhesives, welding, brazing, etc., alone or in combination. Suitable welding processes may include spot welding, MIG welding, ultrasonic welding, or magnetic pulse welding. Subassemblies may further include sheet metal components such as corner gussets, and holes, hardware, or other features particular to the selected configuration and joining methods The wall and roof modules may further comprise a skin, which may be sheet metal, polymer composite, wood composite faced with an exterior polymer or sheet metal layer, or other suitable sheet-like material. The roof module may have a skin of translucent fiberglass composite to admit natural light into the interior.

The load floor/underbody module may be formed from a series of extrusions, each having a rectangular cross section, and oriented longitudinally, i.e., running from the front to the rear of the vehicle. The extrusions may preferably have different profiles depending on their location. The extrusions may be joined by friction stir welding, laser welding, brazing, or other suitable means. The underbody module may further have hardware rigidly attached to the underside for various purposes, such as the attachment of suspension components. Such hardware may include aluminum castings, forgings, machined subassemblies, or other structural members.

The underbody module may further include a box structure defining a battery compartment if the body is intended for an electric or hybrid electric vehicle.

Joining of individual modules or subassemblies to one another may include fasteners, such as rivets or self-tapping or thread forming/thread rolling screws, and structural adhesives. When structural adhesives are used, means may be provided to maintain a uniformly thick bond layer in order to optimize the bond strength.

After assembly, the structure may be given a surface treatment such as painting or powder coating. The structural adhesive and powder coating may be selected such that the bake temperature for the powder coat is the same as the cure temperature of the structural adhesive, so that both process steps may be carried out simultaneously in one bake operation. Notablyly, the modules could be prepainted or coated, because the inventive assembly process is based on adhesives and fasteners to join the modules instead of MIG welding or spot welding, high temperature processes that would damage a prepainted component. This unique feature would allow for greatly reduced paint shop capital investment and almost zero paint shop VOC emissions while enabling use of superior durability powder paint coatings.

According to another aspect of the invention, a method for making a unitary truck body comprises the following steps:

making a load floor and underbody module comprising a plurality of hollow aluminum extrusions of selected cross sections joined together side by side to form a rigid, generally planar structure having an upper surface and a lower surface;

making two or more wall modules comprising hollow aluminum extrusions joined together to form rigid, generally planar structures;

making at least one roof module comprising hollow aluminum extrusions joined together to form a rigid, generally planar structure; and, joining the wall modules to the load floor and underbody module and joining the roof module to the wall modules, thereby forming a rigid structural envelope.

The step of forming the load floor and underbody module may include friction stir welding adjacent extrusions to one another while supporting the extrusions in a fixture that compensates for their different cross sections to align the weld seams in a common plane.

The step of making wall and roof modules may include cutting extrusions to length and securing them in a fixture to set the frame dimensions, then joining the extrusions to one another with one or more of: fasteners, structural adhesives, and weld joints. It may further include the step of attaching a skin comprising sheet metal, wood composite, polymer composite, fiberglass, or other suitable sheet-like materials. The skin may include a precipitation hardening aluminum alloy, which may be installed in an untreated condition and then precipitation hardened during the curing of the structural adhesive. The skin may further be given a coating of paint, dry powder coat, etc. A dry powder coat may be formulated so that its bake temperature coincides with the cure temperature of the structural adhesive so that the two processes may be carried out in a single oven treatment.

The step of joining the different structural modules to one another may include the use of self-tapping or thread forming/thread rolling fasteners and thermosetting structural adhesive.

According to another aspect of the invention, a method for manufacturing an aluminum load floor and underbody module comprises:

providing a plurality of hollow rectangular aluminum extrusions of at least two different cross sections, each having an upper surface and a lower surface when viewed endwise;

providing a fixture whose upper surface is of such a shape that it supports each of the extrusions when placed side by side thereupon so that the abutting surfaces of the extrusions lie in a common plane regardless of the different profiles of the individual extrusions;

clamping the extrusions securely to the fixture and to each other; and, welding the extrusions together along their abutting surfaces to form a rigid generally planar structure with selected structural features on at least one of its upper and lower surfaces.

The different cross sections of extrusions may include at least one extrusion that has a significantly deeper profile than others and thereby provides improved bending strength in the longitudinal direction. The extrusions running along the edges of the module may have cross sections containing structural reinforcements to engage mechanical fasteners for joining the wall modules. One or more extrusions may include ridges that may be partially removed after welding to provide tabs for attachment points or other purposes.

According to another aspect of the invention, a trailer chassis comprises a rigid aluminum structure, the structure comprising:

a load floor and underbody comprising structural extrusions of different cross sections oriented longitudinally and continuously welded together along their abutting edges to form a rectangular platform having an upper surface and a lower surface;

an arm extending longitudinally from one end of the underbody configured to engage a hitch for towing the trailer behind a motor vehicle; and, at least one raised attachment point on the lower surface for attaching a wheeled suspension assembly.

The different cross sections of extrusions may include at least one extrusion that has a significantly deeper profile than others and thereby provides improved bending strength in the longitudinal direction. The extrusions running along the edges of the load floor may have cross sections containing structural reinforcements to engage mechanical fasteners for joining wall modules. One or more extrusions may include ridges that may be partially removed after welding to provide tabs for attachment points or other purposes.

According to another aspect of the invention, a trailer body comprises a rigid aluminum structure, the structure comprising:

a load floor and underbody comprising structural extrusions of different cross sections oriented longitudinally and continuously welded together along their abutting edges to form a rectangular platform having an upper surface and a lower surface;

an arm extending longitudinally from one end of the underbody configured to engage a hitch for towing the trailer behind a motor vehicle;

at least one raised attachment point on the lower surface for attaching a wheeled suspension assembly;

subassemblies comprising aluminum extrusions formed into frames defining vertical walls; and optionally, at least one subassembly comprising aluminum extrusions formed into a frame defining the body roof;

and wherein the load floor, the wall subassemblies, and the optional roof subassembly, if present, are fastened together to form a rigid final assembly.

According to other aspects of the invention, a major advantage to the longitudinal FSW section platform is the many shapes and sizes that can be run on the same process equipment:

a) A FSW machine with changeable tooling beds can support whichever floor is to be assembled, and Applicants contemplate that the supporting pallet for a particular floor design can be made in this machine itself to sub-assemble each floor type. So the FSW machine effectively makes its own custom tooling: a heavy-duty pallet with machined slots to accommodate the bottom side of the chassis floor that is to be assembled.

b) A CNC machining system is capable of unique or flexible tooling beds to machine any floor, likely requiring robotic flip of the floor during the process.

c) A MIG welding system or other joining method to add parts or assemblies to complete the floor platform system is also capable of many variants.

d) With most parts requiring machining in the floor module the parts can be designed to self-locate, thereby minimizing tooling as compared to traditional methods of assembly.

According to another aspect of the invention, when joining a body by means of adhesive and fasteners such as trilobular screws this step can be done either by robot or manually. An operator using a DC nutrunner can determine the number of screws run to a given torque curve which proves the number of screws required have been run to proper torque, thereby aiding in overall quality assurance processes. The process is low-cost in terms of capital expenditure, highly flexible, and adaptable to volume requirements. As volume increases the more difficult to reach fastened locations can be done by operators while the easiest locations can be completed with robots.

Example

Figure 17A:
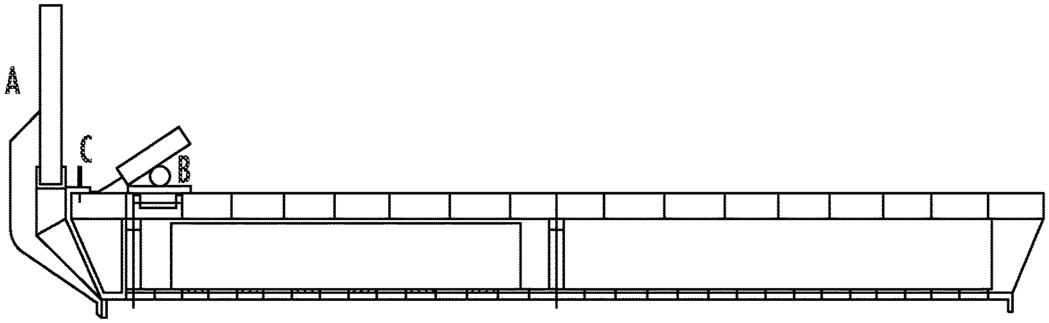
FIGS. 17A-C schematically illustrate a repair process FIGS. 17A-C, in case the outer Side Panel (A) needs replacement.
Figure 17B:
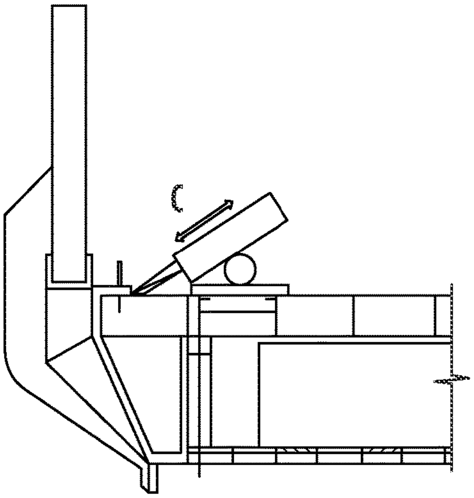
Figure 17C:
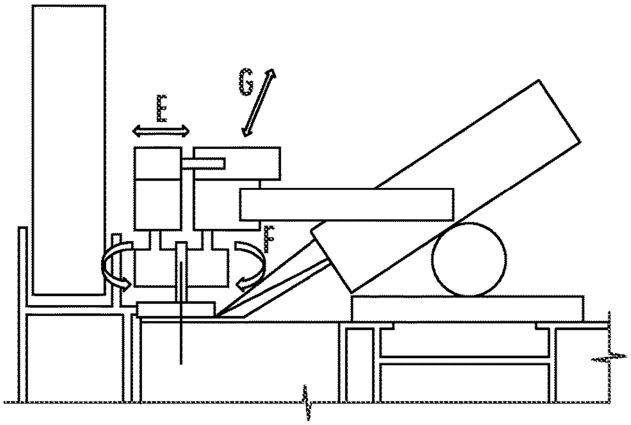

According to another aspect of the invention, a repair tool for cutting the adhesive in case of module replace is contemplated. The repair tool is preferably a battery-operated heated blade design with interchangeable blades of varying shape to separate all adhesive joint configurations. Referring to FIGS. 17A-C, in case the outer Side Panel (A) needs replacement: Open profile tray and insert guide rail (B) for repair system Multi purpose flange (C). Repair system is a heated wedge shape repair tool (D) to peel off glue and lifts off the structure slightly. Repair Tool clamps onto Multi-Purpose flange (E). Rollers turn (F) and propel Repair Tool alongside Multi-Purpose flange (G) in X direction of vehicle.

The invention claimed is:

1. A vehicle body comprising a rigid aluminum space frame, the space frame comprising:

a load floor and underbody subassembly comprising aluminum structural extrusions oriented longitudinally and welded together along their length to form a rigid platform, wherein the load floor and underbody subassembly comprises two structural extrusions having a deeper profile than the other extrusions forming the load floor, thereby forming structural beams to provide longitudinal stiffness;

subassemblies comprising aluminum extrusions formed into frames defining body walls; and, at least one subassembly comprising aluminum extrusions formed into a frame defining a body roof;

wherein the load floor, wall subassemblies, and roof subassembly are attached to one another to form a rigid body assembly.

2. The vehicle body of claim 1 wherein the load floor and underbody further comprises an additional structural component joined to the underbody for selected purposes.

3. The vehicle body of claim 2 wherein the additional structural component is selected from the group consisting of: cast components; forged components; and machined components.

4. The vehicle body of claim 2 wherein the additional structural component performs a function selected from the group consisting of:

forming an attachment point for suspension components;
forming a wheel well;
forming a transmission tunnel;
forming cable runs and tie points;
forming mounting brackets for interior components; and,
forming attachment points for a battery assembly.

5. The vehicle body of claim 1 wherein the load floor comprises extrusions of three cross sections, wherein:

wider, thinner extrusions form the main area of the load floor;

narrower, deeper extrusions form structural beams to provide longitudinal stiffness; and, extrusions along the outer edges of the load floor form attachment points for the body wall modules.

6. The vehicle body of claim 1 wherein the structural beams contain openings on at least one surface so that the interior volume of the extrusion can serve as a cable run.

7. The vehicle body of claim 1 wherein any of the load floor, wall subassemblies, or roof subassemblies is prewired so that selected electrical fixtures may be attached.

8. The vehicle body of claim 1 wherein the load floor, wall subassemblies, and roof subassemblies are attached to one another by a combination of mechanical fasteners and polymer adhesive.

9. The vehicle body of claim 8 wherein the polymer adhesive comprises a thermoplastic material so that a module may be removed by removing the metal fasteners and cutting the thermoplastic with a heated tool.

10. The vehicle body of claim 1 wherein the frames defining the body walls and the roof comprise an outer covering of a selected material.

11. The vehicle body of claim 10 wherein the outer covering material is selected from the group consisting of: sheet metal; polymer and polymer composite sheets; carbon-fiber composite sheets; hollow core composites; opaque materials; and translucent materials.

12. The vehicle body of claim 10 wherein the body wall subassemblies are pre-assembled and painted before attaching to the load floor.

13. The vehicle body of claim 1 wherein the vehicle is selected from the group consisting of: delivery trucks, mail delivery trucks, small buses, recreational vehicles, cars, all-terrain vehicles (ATVs), utility task vehicles (UTVs), vans, and trailers.

14. A method for making a unitary truck body comprising the following steps:

making a load floor and underbody subassembly comprising a plurality of hollow aluminum structural extrusions of selected cross sections welded together side by side to form a rigid platform, wherein the load floor and underbody subassembly comprises two structural extrusions having a deeper profile than the other extrusions forming the load floor, thereby forming structural beams to provide longitudinal stiffness;

making two or more wall subassemblies, each comprising hollow aluminum extrusions joined together to form a generally planar structure;

making at least one roof subassembly comprising hollow aluminum extrusions joined together to form a roof structure; and, joining the wall subassemblies to the load floor and underbody subassembly, and to each other, and joining the roof subassembly to the wall subassemblies, thereby forming a rigid structural space frame.

15. The method of claim 14 further comprising the step of:

attaching an additional structural component to the load floor and underbody to perform a function selected from the group consisting of:

forming an attachment point for suspension components;
forming a wheel well;
forming a transmission tunnel
forming cable runs and tie points;
forming mounting brackets for interior components; and,
forming attachment points for a battery assembly.

16. The method of claim 14 further comprising the step of:

pre-wiring any of the load floor, wall subassemblies, and roof subassembly so that selected electrical fixtures may be attached thereto.

17. The method of claim 14 further comprising the step of:

covering the outer surfaces of the wall subassemblies and the roof subassembly with sheets of a selected material.

18. The method of claim 17 wherein the outer covering material is selected from the group consisting of: sheet metal; polymer and polymer composite sheets; carbon-fiber composite sheets; hollow core composites; opaque materials; and translucent materials.

19. The method of claim 14 wherein the deeper extrusions are spaced apart sufficiently so that a battery assembly is accommodated therebetween.

* * * * *